(12) United States Patent
Simonis

(10) Patent No.: US 7,920,468 B2
(45) Date of Patent: Apr. 5, 2011

(54) METHOD AND SYSTEM FOR CONSTRAINT-BASED TRAFFIC FLOW OPTIMISATION SYSTEM

(75) Inventor: Helmut Matthias Simonis, Richmond (GB)

(73) Assignee: Cisco Technology, Inc., San Jose, CA (US)

(*) Notice: Subject to any disclaimer, the term of this patent is extended or adjusted under 35 U.S.C. 154(b) by 1479 days.

(21) Appl. No.: 10/505,444

(22) PCT Filed: Feb. 17, 2003

(86) PCT No.: PCT/GB03/00669
§ 371 (c)(1),
(2), (4) Date: May 2, 2005

(87) PCT Pub. No.: WO03/075512
PCT Pub. Date: Sep. 12, 2003

(65) Prior Publication Data
US 2005/0201285 A1    Sep. 15, 2005

(30) Foreign Application Priority Data
Mar. 1, 2002    (GB) .................................... 0204914.6

(51) Int. Cl.
*H04J 1/16*    (2006.01)
(52) U.S. Cl. ........................................ 370/230; 370/252
(58) Field of Classification Search .................. 370/237, 370/230, 235, 252, 225, 337, 468, 370, 244, 370/254, 351, 255, 216, 395, 386; 709/232, 709/226, 223, 204; 445/452
See application file for complete search history.

(56) References Cited

U.S. PATENT DOCUMENTS

| 5,042,027 | A | | 8/1991 | Takase et al. |
| 5,917,806 | A | * | 6/1999 | Lin et al. ....................... 370/237 |
| 6,108,303 | A | * | 8/2000 | Fahmi et al. ................... 370/230 |

(Continued)

FOREIGN PATENT DOCUMENTS

| EP | 1 035 703 A | | 9/2000 |
| EP | 1 043 871 A | | 10/2000 |
| GB | 2 311 193 | | 6/1996 |
| WO | WO 96/19905 | * | 6/1996 |
| WO | WO 99/21301 | | 4/1999 |

OTHER PUBLICATIONS

Fortz B et al: "Internet traffic engineering by optimizing OSPF weights" Infocom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 519-528, XP010376140 ISBN: 0-7803-5880-5, abstract p. 521, left-hand col., paragraph II.-p. 522, right-hand col., paragraph IV.

(Continued)

*Primary Examiner* — Kwang B Yao
*Assistant Examiner* — Syed M Bokhari
(74) *Attorney, Agent, or Firm* — Cindy Kaplan

(57) ABSTRACT

A method of calculating traffic values in a communications network (1), the communications network comprising a plurality of nodes (2,4), the nodes being connected to one another by links (24), the method comprising: (a) obtaining traffic data measurements (102) through said nodes and/or links in an initial scenario as input data; (b) deriving a traffic flow model for a modified scenario using a plurality of constraints describing the interdependency of said initial to said modified scenario (116); and (c) calculating values and/or upper and lower bounds of traffic values for said modified scenario from said traffic flow model using said input data (118).

25 Claims, 10 Drawing Sheets

U.S. PATENT DOCUMENTS

| | | | |
|---|---|---|---|
| 6,404,744 B1* | 6/2002 | Saito | 370/255 |
| 6,498,778 B1* | 12/2002 | Cwilich et al. | 370/216 |
| 6,594,268 B1* | 7/2003 | Aukia et al. | 370/400 |
| 6,842,463 B1* | 1/2005 | Drwiega et al. | 370/468 |
| 6,970,429 B2* | 11/2005 | Arsikere et al. | 370/244 |
| 7,047,309 B2* | 5/2006 | Baumann et al. | 709/232 |
| 7,068,630 B1* | 6/2006 | San Filippo, III | 370/337 |
| 7,106,696 B1* | 9/2006 | Lim et al. | 370/230.1 |
| 7,111,074 B2* | 9/2006 | Basturk | 709/241 |
| 7,162,250 B2* | 1/2007 | Misra | 455/453 |
| 7,206,289 B2* | 4/2007 | Hamada | 370/252 |
| 7,302,482 B2* | 11/2007 | Rodosek et al. | 709/224 |
| 2002/0167898 A1* | 11/2002 | Thang et al. | 370/216 |
| 2003/0007484 A1* | 1/2003 | Beshai | 370/370 |
| 2003/0043792 A1* | 3/2003 | Carpini et al. | 370/386 |
| 2003/0095501 A1* | 5/2003 | Hofner et al. | 370/225 |
| 2003/0118027 A1* | 6/2003 | Lee et al. | 370/395.21 |
| 2003/0126246 A1* | 7/2003 | Blouin et al. | 709/223 |

OTHER PUBLICATIONS

Girish M K et al: "Formulation of the traffic engineering problem in MPLS based IP networks" Fifth IEEE Symposion on Computers and Communications, ISCC 2000, Jul. 3, 2000, pp. 214-219, XP010505349 p. 216, left-hand col., paragraph 3.-p. 218 right-hand col., paragraph 4.

Papadopoulos C V et al: "Protection and Routing Algorithms for Network Management the Case of Transmission Networks" Microprocessing and Microprogramming, Elsevier Science Publishers, BV., Amsterdam, NL, vol. 38, No. 1/5, Sep. 1, 1993, pp. 163-170, XP000383771 ISSN: 0165-6074, p. 164, left-hand col., paragraph 1.1.-p. 166, left-hand col., paragraph 2. p. 168, left-hand col., paragraph 3.-p. 170, left-hand col., paragraph5.

* cited by examiner

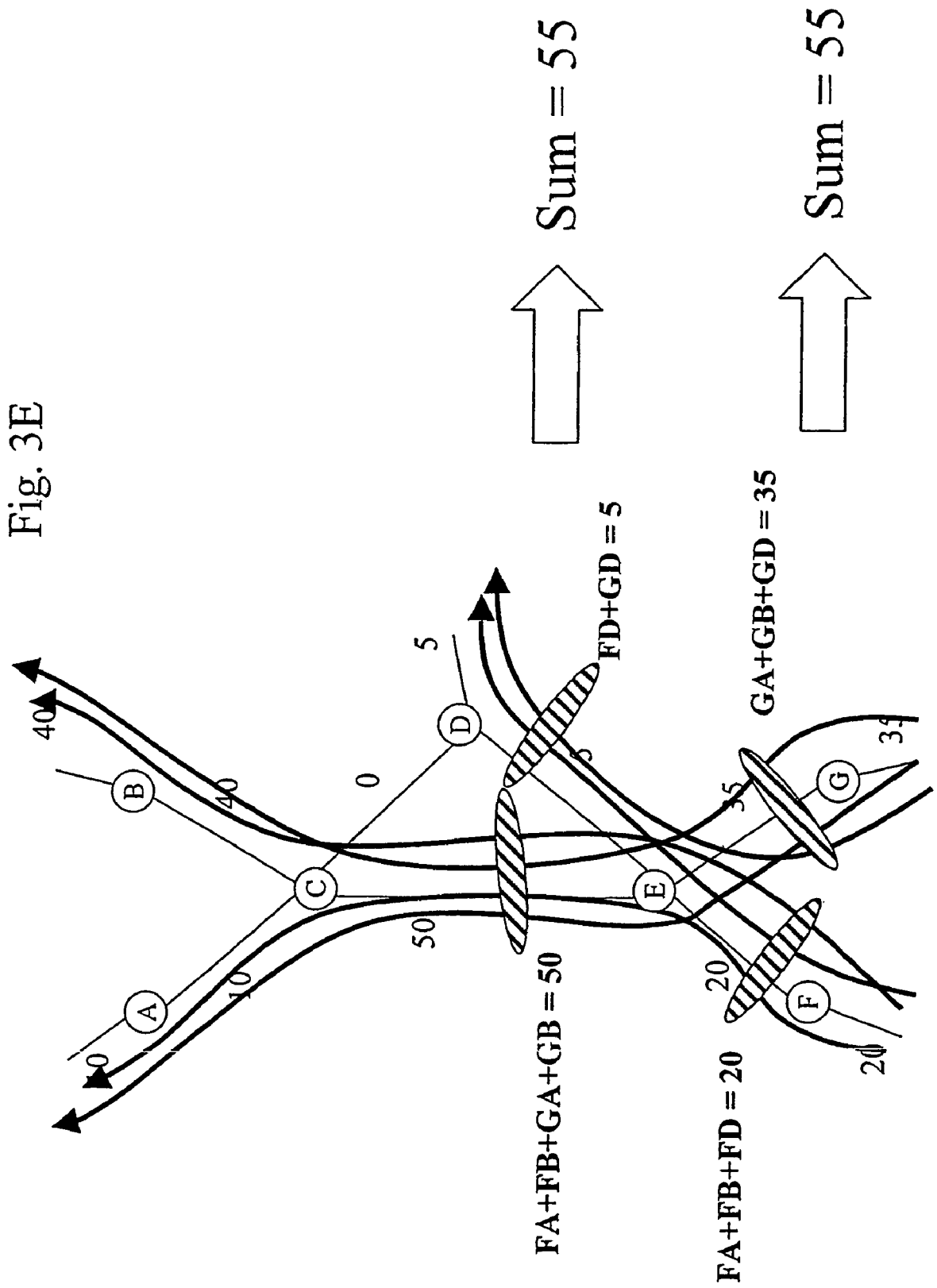

Add new line EB ably tight bounds can be derived for the desired traffic
METHOD AND SYSTEM FOR CONSTRAINT-BASED TRAFFIC FLOW OPTIMISATION SYSTEM This application is a 371 of co-pending PCT application PCT/GB03/00669 filed Feb. 17, 2003, which was published in English under PCT Article 21(2) on Sep. 12, 2003, which claims the benefit of GB Application No. 0204914.6 filed Mar. 1, 2002. These applications are incorporated herein by reference in their entireties.

This invention relates to traffic flow optimisation systems. More particularly, but not exclusively, it relates to methods of calculating data traffic flows in a communications network.

BACKGROUND

Today, large communications networks are serviced by more than 30,000 Internet Service Providers (ISPs) across the world, predominantly operating on a commercial basis as a service provider. The services range from the mass-marketing of simple access products to service-intensive operations that provide specialized service levels to more localized internet markets. The present application mainly concerns ISPs providing networks, referred to more generally as network service providers.

With networks playing an ever increasing role in today's electronic economy, an efficient management of the networks and an efficient planning of future modifications is advantageous.

With the rapid growth of network usage, network service providers are currently facing ever increasing expectations from their customers to the quality of service (minimum delay, maximum reliability, high bandwidth for data transfer rates, low costs, etc). The main task is to satisfy the quality of service parameters while maximising the return of investment, i.e. to ensure an efficient utilisation of the available bandwidth in addition, but there are issues relating to future sales, strategic planning and business development. One concerns Service Level Agreements (SLAs) with their customers.

An SLA is a service contract between a network service provider and a subscriber, guaranteeing a particular service's quality characteristics. SLAs usually focus on network availability and data-delivery reliability. Violations of an SLA by a service provider may result in a prorated service rate for the next billing period for the subscriber.

Thus it is important for a network service provider to know whether it can issue an SLA to another customer without violating any existing SLAs. Here it needs to estimate what is the largest new workload that the network can handle with respect to network availability and data-delivery reliability.

In strategic planning, the objective is to investigate how to revise the existing network topology (and connection points to external nodes) such that the resource utilization is minimized and more balanced. The problem is to minimize the resource utilization by determining which backbone links are overloaded, and to add links to the network to redistribute the load. For a given workload, the question is where to add the links in the network and what is the required bandwidth of each backbone link such that the capacity of the new network topology is greater, i.e. can deal with a larger load. Another question concerns which node should be used to connect a new customer to the network. This should be the one which minimises resource utilisation and expands capacity in the most cost effective way.

There are several tools available for planning and optimising communications networks. They are usually based on a discrete event simulation of the network. For this, a typical scenario of end-to-end loads must be provided as input by the user. Starting from this scenario, the tool simulates the transport of the traffic through the network, observing link utilization overload and other events.

End to end traffic data are usually obtained by obtaining probes or router-based information. Such a method is expensive to implement and usually only a part of the whole network is equipped with data collection points. The data collection process has the additional disadvantage that it adds to the traffic congestion of the network.

Such traffic data, if available, may then be used in network modelling or a network simulation. However, most simulations are not based on real data, but only on estimates. The simulation is then used for network planning or optimisation tools. The user usually defines a scenario which is then tested using the simulation tool.

Another approach is described in the applicant's patent application GB 0 028 848, filed on 27 Nov. 2000 (agent reference J42831GB), which is hereby incorporated by reference. In the approach real link traffic data are used to derive end-to-end traffic load intervals. Link traffic data are collected during a limited time period. Thus a "snapshot" of the data traffic is obtained. Data collection may be repeated at certain times or periodically. The results of this process are subsequently used in a traffic flow optimisation system to estimate traffic loads in the given scenario. This approach has the disadvantage that it is difficult to derive meaningful intervals for the end-to-end load in the optimisation process, especially if multiple modifications are to be continued to give a consistent estimate in traffic flow. Another disadvantage of the method is that it is difficult to work from a plurality of traffic flow intervals in the optimisation or planning process.

SUMMARY OF THE INVENTION

It is an aim of the present invention to alleviate some of the disadvantages mentioned above and to provide a traffic flow optimisation system based on measured traffic data which does not require complete end-to-end traffic loads.

It is a further aim of the present invention to calculate traffic values in a communications network for a modified scenario using measured traffic data of the initial network.

According to one aspect of the present invention, there is provided a method of calculating traffic values in a communications network, the communications network comprising a plurality of nodes, the nodes being connected to one another by links, the method comprising: (a) obtaining traffic data measurements through said nodes and/or links in an initial scenario as input data; (b) deriving a traffic flow model for a modified scenario, using a plurality of constraints describing the interdependency of said initial to said modified scenario; and (c) calculating values and/or upper and lower bounds of traffic values for said modified scenario from said traffic flow model using said input data.

In this way traffic values can be calculated for a modified network (or modified scenario) using measured traffic data of the initial, unmodified network (or scenario).

By deriving constraints from the interdependency of the initial and modified network, the exact traffic data are used in the calculation for the modified scenario if they are not affected by the modification. In this way either exact values or relatively tight bounds can be derived for the desired traffic values in a modified network.

Preferably, the measured traffic data are corrected if inconsistencies are detected. In this way more accurate and reliable traffic values can be derived.

According to another aspect of the present invention, there is provided a method of calculating traffic values in a communications network, the communications network comprising a plurality of nodes, the nodes being connected to one another by links, the method comprising: (a) obtaining data traffic measurements through said nodes and/or links in an initial scenario as input data; (b) considering a modified scenario; (c) defining one or more solution variables for said modified scenario; (d) determining constraints between traffic flows through said links and nodes in the initial and the modified scenarios; (e) deriving a traffic flow model using said input data and said relations for calculating said solution variables.

In this way traffic values for modified scenario, like for example in forecasting, network planning or resilience analysis, can be calculated using measured traffic data of the initial, unmodified network and constraints based on the initial network, like network topology and network behaviour of the initial network.

Further aspects and advantages of the invention will be appreciated, by example only, from the following description and accompanying drawings, wherein FIG. 1 illustrates a simplified example of an Internet Protocol (IP) network in which the present invention can be implemented;

FIGS. 3A to 3J illustrate in a simplified way the method used to calculate the traffic values in a modified scenario according to the present invention;

Figure 1:
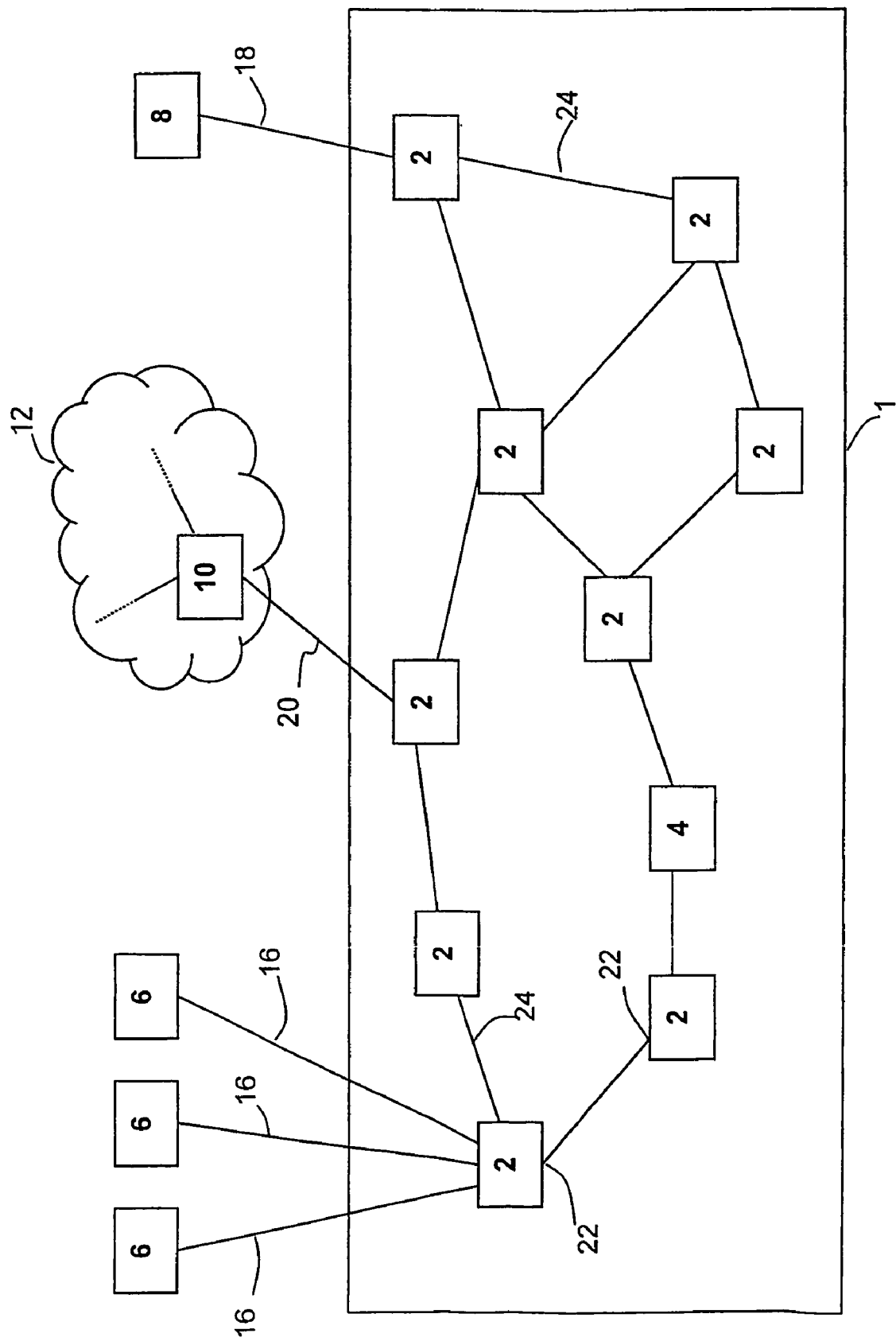

FIG. 1 illustrates a simplified example of an Internet Protocol (IP) network. Generally, such a network consists of nodes and links. Nodes in an IP network may either be internal or external. An internal node represents a location in the network where traffic data is directed through the network. It can be of two types: a device node 2 denoting a network device such as for example a router or a network node 4 denoting a local network (e.g. Ethernet, FDDI ring). An external node 6 represents a connection to the IP network from other networks.

A link is a directed arc between two nodes. Depending upon the nature of the two nodes, network links take different denominations. There are two main types of links, the backbone and access links.

A backbone link 24 is a link between two internal nodes; at least one of them must be a device node. Indeed, every link in an IP network can connect either two device nodes or one device node and one network node. A connection to a device node is realized via a physical port of the device. If the device is a router, then the port is called router-interface 22. A connection to a network node is realised via a virtual port of the network.

An access link is a link between a device node and an external node. Access links include peering lines 18, uplink lines 20 and customer lines 16.

A PoP (point of presence) is the set of all devices co-located in the same place.

The link traffic is the volume of data transported through a link and is measured in mbps (mega bits per seconds). The bandwidth of a directed link defines the maximum capacity of traffic that can be transported through this link at any one time.

In this embodiment, we refer to IP-based networks. In an IP network the device nodes are represented by routers; we assume that any two nodes are directly connected by at most one link, and every external node is directly connected to one internal device node.

A path from a source to a destination node is a sequence of linked nodes between the source and destination nodes. A route is a path between end-to-end internal nodes of a network that follows a given routing protocol.

A traffic load is the load of data traffic that goes through the network between two external nodes independently of the path taken over a given time interval.

A traffic flow between external nodes is the traffic load on one specific route between these nodes over a time interval.

A router is an interconnection between network interfaces. It is responsible for the packet forwarding between these interfaces. It also performs some local network management tasks and participates in the operations of the routing protocol (it acts at layer 3, also called the network protocol layer). The packet forwarding can be defined according to a routing algorithm or from a set of static routes pre-defined in the routing table.

A routing algorithm generates available routes for transporting data traffic between any two nodes of a given network.

In the following, embodiments of the present invention will be described which are based on the OSPF (Open Shortest Path First) routing algorithm for IP-based networks. This algorithm determines optimal routes between two network nodes based on the "shortest path" algorithm. The metrics to derive the shortest path are fixed for each link, and hence the routing cost is computed by a static procedure. The lowest routing cost determines the optimal route. If there is more than one optimal path, then all optimal paths are solutions (best routes) and the traffic load between the two end-nodes is divided equally among all the best routes.

Figure 2:
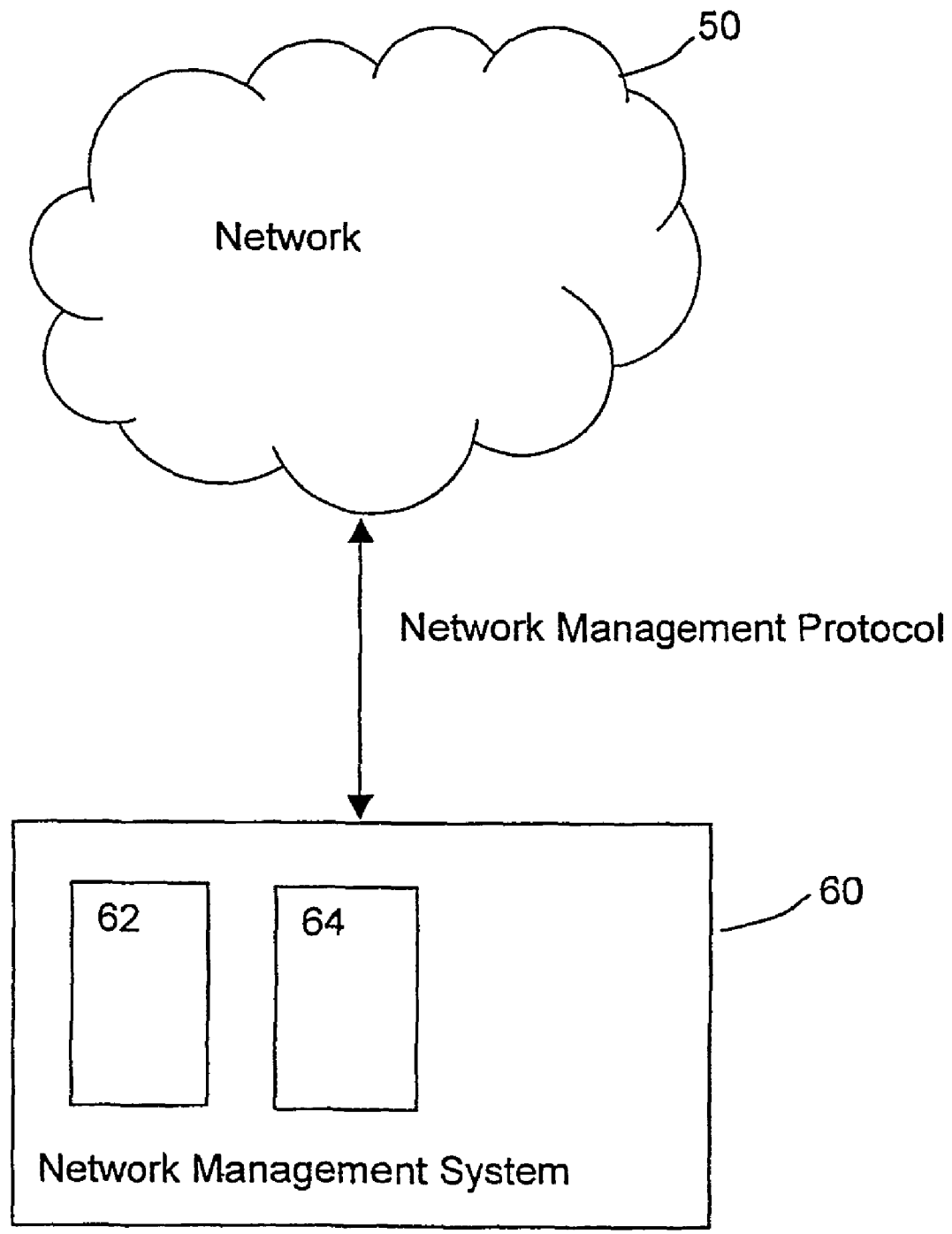
FIG. 2 illustrates the relationship of a network and a network management system, into which the present invention may be implemented.

FIG. 2 illustrates the relationship of the network and a network management system 60 in which the present invention may be implemented. Network management system 60 performs the network management functions for network 50. The network management system communicates with the network using a network management protocol, such as the Simple Network Management Protocol (SNMP). The network management system 60 includes a processor 62 and a memory 64 and may comprise a commercially available server computer. A computer program performing the calculation of data traffic flow is stored is memory 64 and can be executed by processor 62.

The traffic flow optimisation system may comprise a network planner, a resilience analyser and/or a forecaster. These elements may either be implemented in the network management system or in a connected computer system.

A network planner identifies potential network bottlenecks using the traffic flow results, suggests a set of best possible changes to the network topology and reports on the analysis of the effects of such changes to the network and services. Such changes may include topological changes or methods of traffic engineering like modification of the routing metrics or the implementation of tunnels, i.e. methods of routing traffic in one particular node in different directions. Such a tunnel may for example be used to route traffic coming into the node from a first and a second node into one direction, and traffic coming into the node from a third node into another direction The resilience analyser identifies which of the existing links in the network will be overloaded in the event that certain links (sets of links) fail.

The forecaster identifies the impact on the network of rising traffic volume.

Input data for the network optimisation system are network data and traffic data.

Network data contains information about the network topology, as for example information about the nodes, routers, links, the router interfaces, the bandwidth of each link or the parameters of the routing protocol used. Such a routing protocol may for example be the OSPF (Open Shortest Path First) protocol. Alternatively, other routing protocols like ISIS (Intermediate System to Intermediate System) and EIGRP (Enhanced Interior Gateway Routing Protocol) may be used. In addition, information about the transport layer may be used, such as the TCP transport protocol or the UDP transport protocol. The list of static routes may also be included. Network data may also include information about the end-to-end paths as for example all optimal routes.

Traffic data are measured directly from the network considered. Suitable network elements have to be selected from which information is provided and in which measurements of traffic data are made. The measured quantities may for example be the flow between two nodes, the flow between two groups of interfaces for two nodes, the traffic entering or leaving a link.

In the embodiments described, traffic data are provided as snapshots of current traffic on the network. Traffic data are collected for a certain time interval and are collected on a regular basis. According to one embodiment, traffic data are collected every 5 minutes and the user may choose the interval over which data is collected. A time interval of, for example, 20 to 25 minutes is suitable. Measurements relating to the average flow rate of traffic data passing through every link are taken and stored. The average flow rate of traffic data is the total traffic volume divided by the time interval. For example if a total traffic of 150 Mbit have been counted between T1 and T2, the average data is 150/(T2−T1) Mbps. This approach does not show high peaks in the traffic. But it is sufficient to determine the load being carried through a network.

According to the embodiments described herein, traffic data is collected either directly from the network devices or from tables stored in the network management system. The network management protocol such as the SNMP provides access to the incoming and outgoing traffic at a given time at each router and each router interface.

The general concept of the traffic flow optimiser will now be explained with help of a simplified model.

Figure 3B:
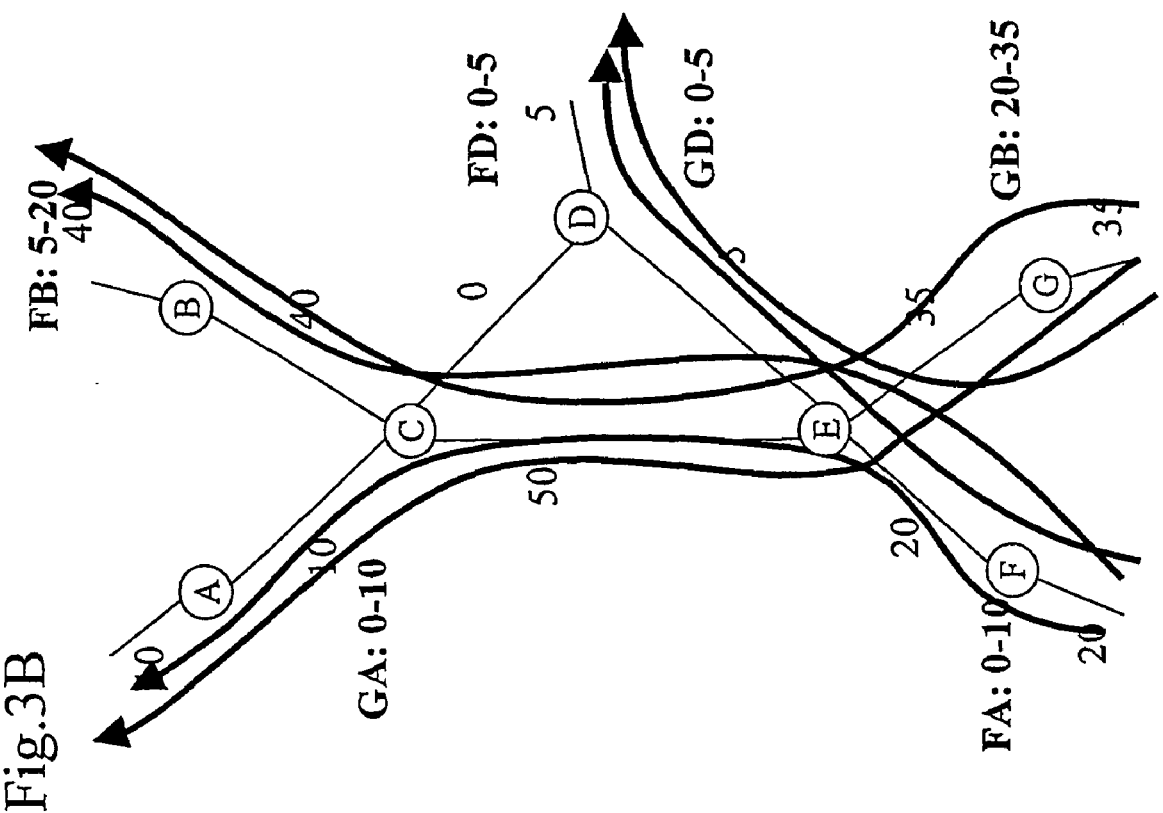
Figure 3A:
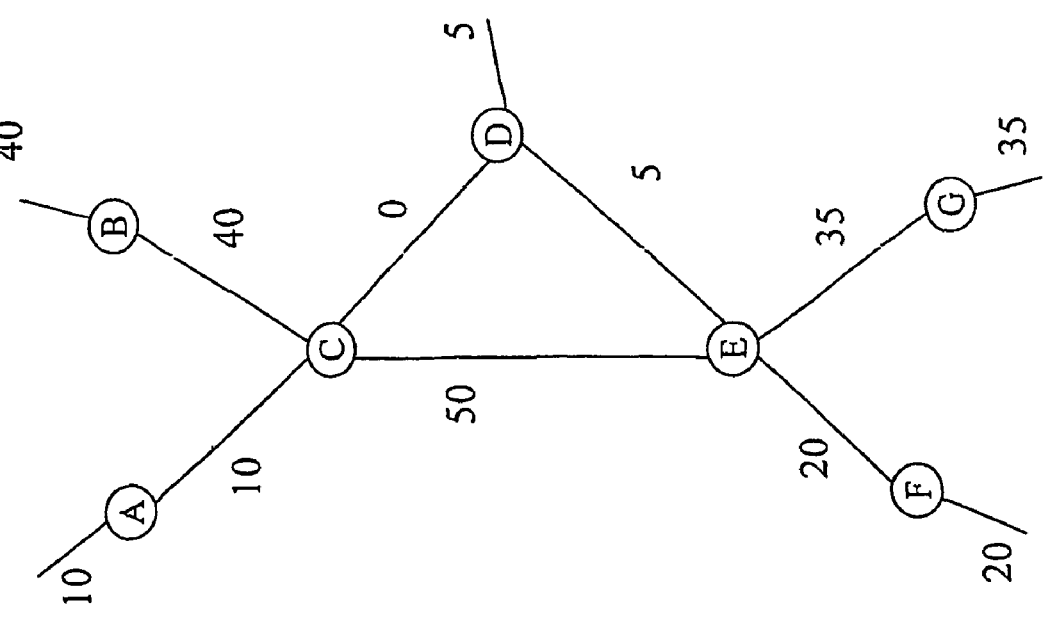

FIG. 3A shows a simplified network including network nodes A to G. The snapshot traffic measurement shows a link traffic between node F and E of 20, between G and E of 35 and soon.

FIG. 3B shows intervals of the flow variable (i.e. end-to-end flow) which can be derived from the measured traffic data as is described in patent application GB 0 028 848. For example the traffic flow FA can be determined to be in the range 0 to 10, then flow GB is between 20 and 35.

Figure 3D:
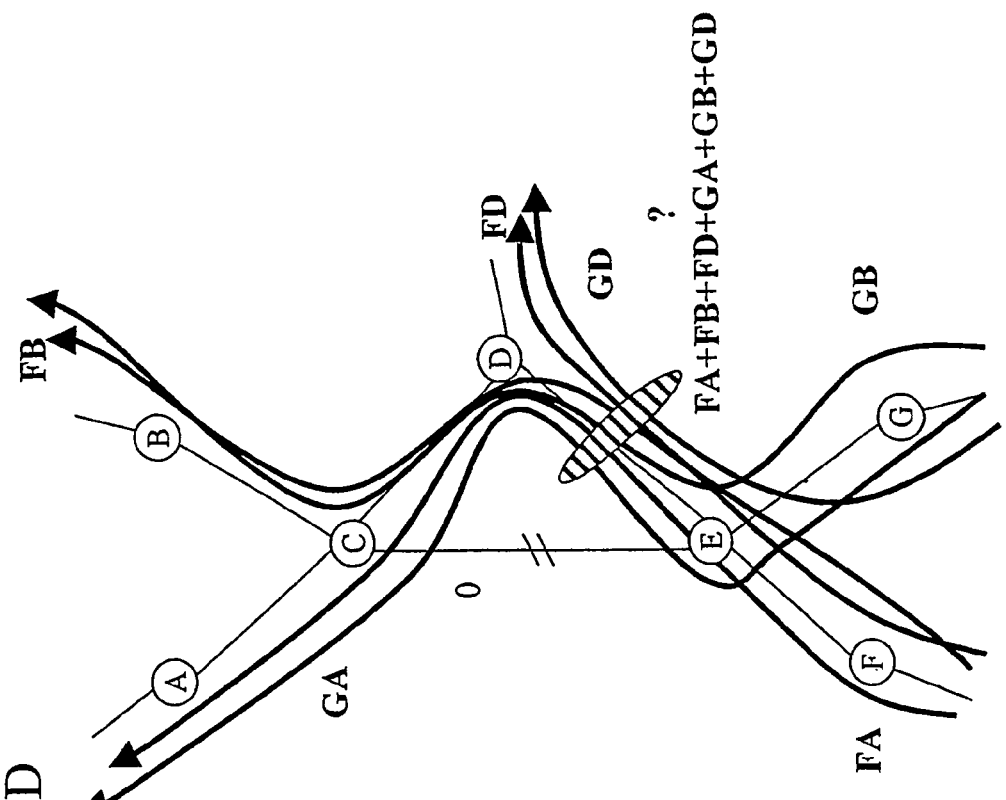
Figure 3C:
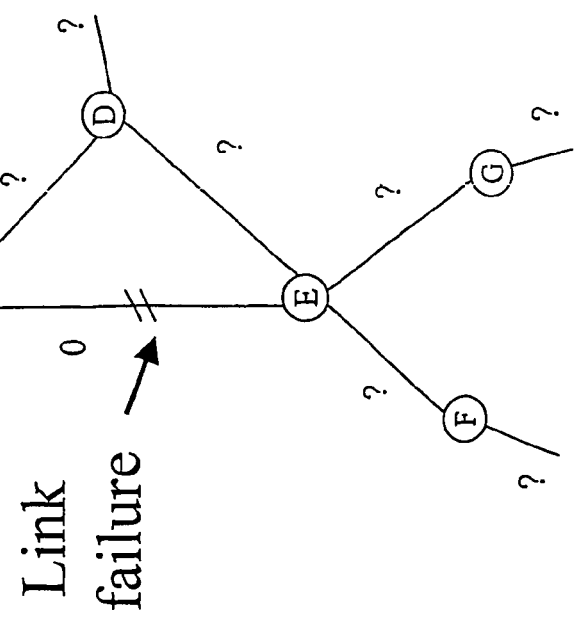

In a resilience analysis we are now interested in the traffic on the individual links if one link fails. FIGS. 3C and D illustrate a link failure between nodes E and C. All traffic between nodes E and C has now to be re-routed. In the example the traffic goes via node D.

In the example we are now especially interested in the traffic between E and D. The important question in a resilience analysis is whether the link considered, here the link between nodes E and D can handle the total amount of traffic which now, after the link failure, flows over the link.

FIG. 3B illustrates that in the normal case only the traffic from F to D and G to D uses the link ED. In case of the link failure all traffic on the routes FA, FB, FD, GA, GB and GD goes over this link.

Thus we want to know what the total volume for all these flows is. We can derive the line traffic in the modified network (i.e. where the link failed) from the original, un-modified network, as is illustrated in FIG. 3E.

In this case we can use two constraints from the initial network. Looking at the traffic between nodes F and E, we know that all traffic FA, FB and FD goes over this link and from the measurement we know that the total traffic on this link is 20. Looking at the link between nodes G and E, we know that traffic GA, GB and GD goes over the link and that the total traffic on this link is 35. Thus we can derive a value for the traffic FA+FB+FD+GA+GB+GD, which yields 20+35=55. In this example we can use a second constraint, from which we also get a value for FA+FB+FD+GA+GB+GD. Looking at the traffic on links EC and ED also yields a value of 55.

Figure 3F:
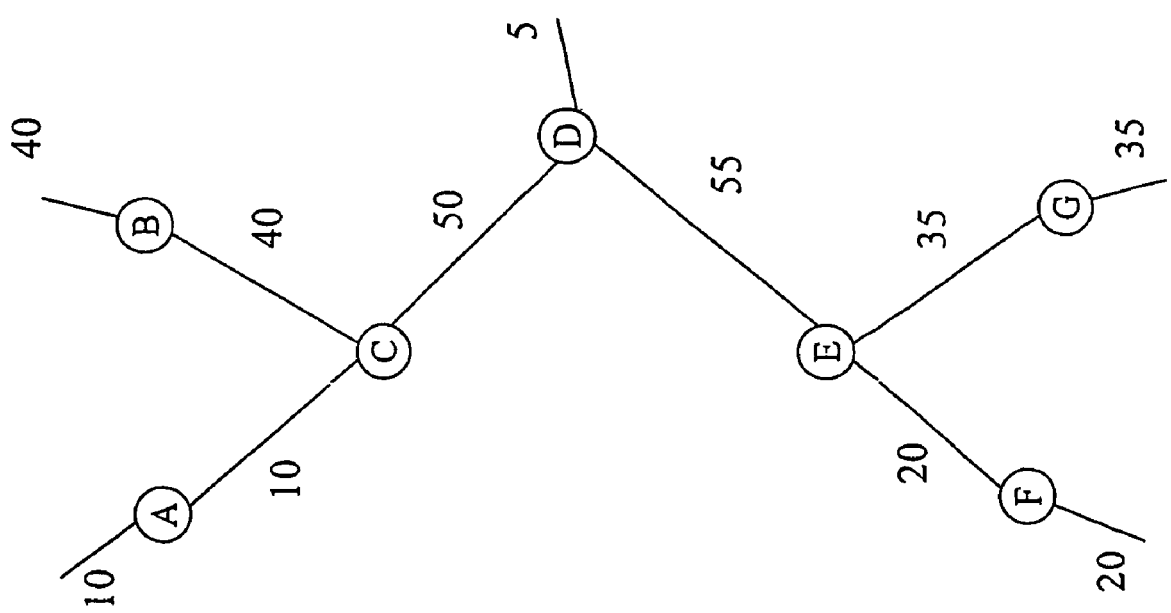

Thus we can estimate the utilisation of the individual links after link failure. The values are shown in FIG. 3F.

In a second example we illustrate how we can derive traffic data for a planned topology change. We again start from initial network as shown in FIG. 3A.

Figure 3H:
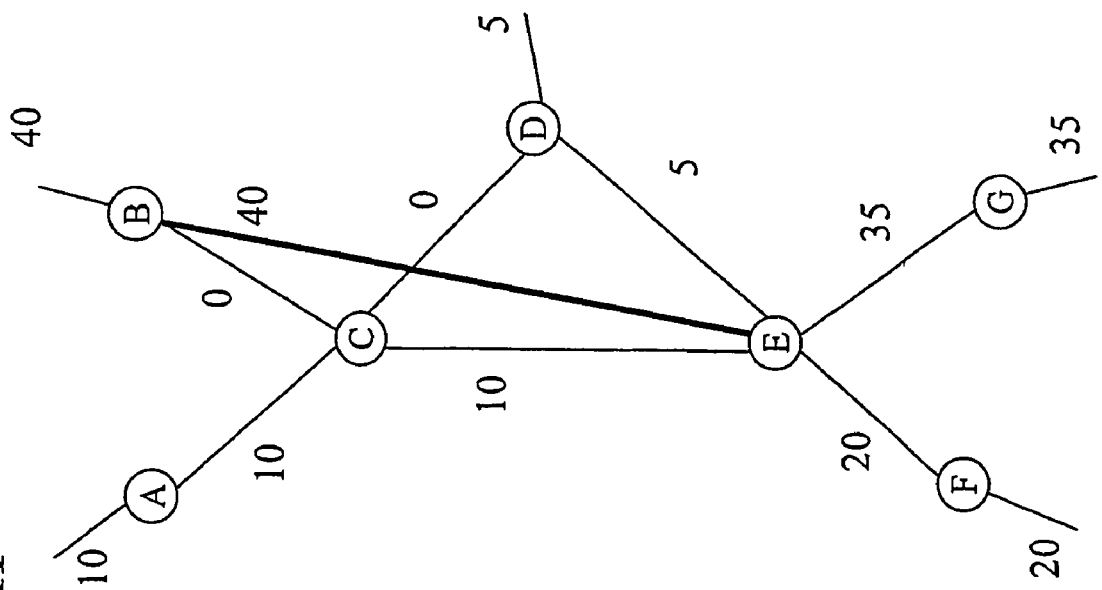
Figure 3G:
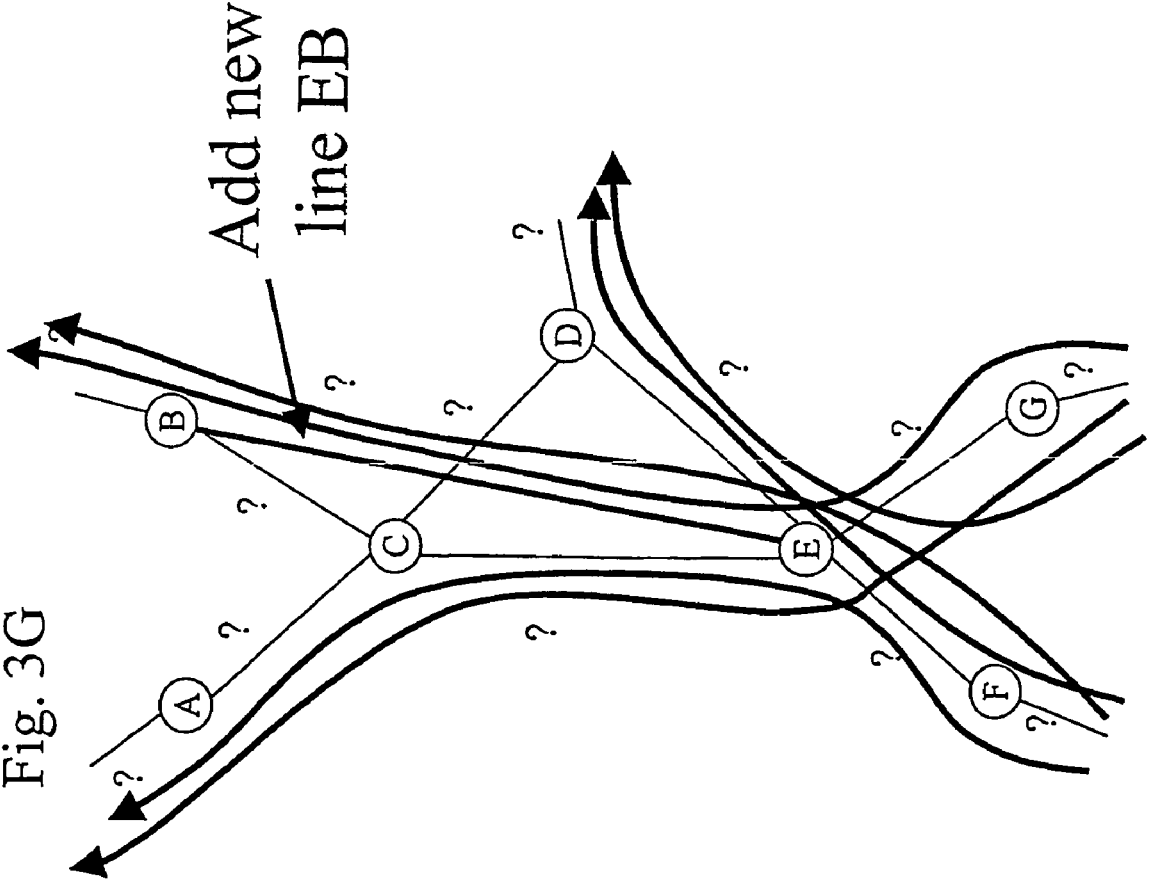

Referring to FIG. 3G, the question is now how the traffic data would be modified if we add a new link between nodes E and B. We can again derive the values for the modified network by using constraints derived from the initial network. In FIG. 3H the resulting utilisation of the links is shown. We can derive that the traffic on a new link EB would be 40.

In a third simplified example we show that we can not always derive exact value for the traffic in which we are interested, but that we might only be able to derive an upper and lower bound for certain traffic values.

Figure 3J:
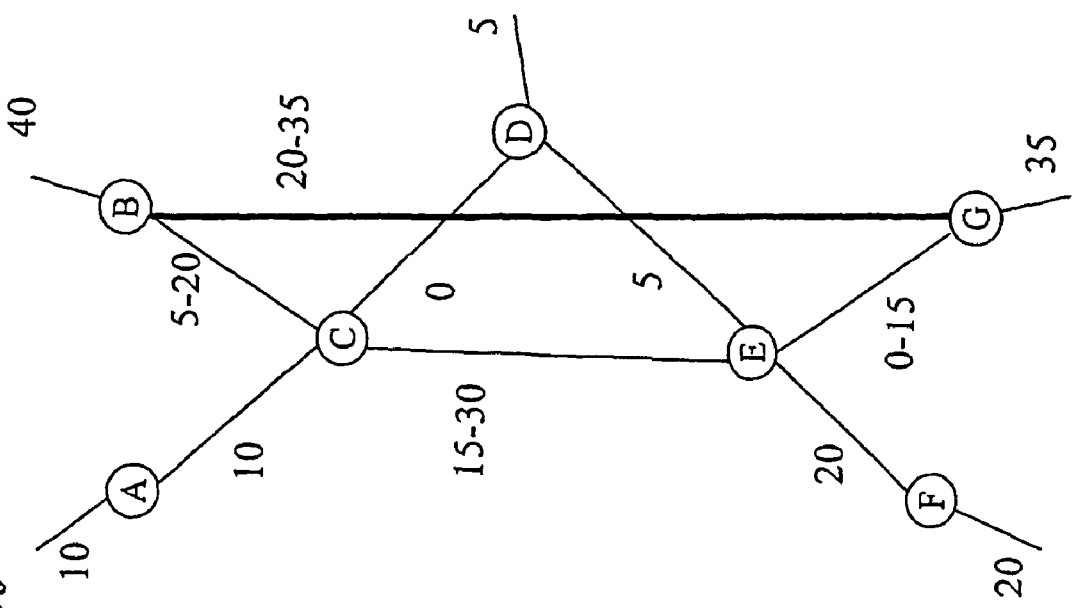
Figure 3I:
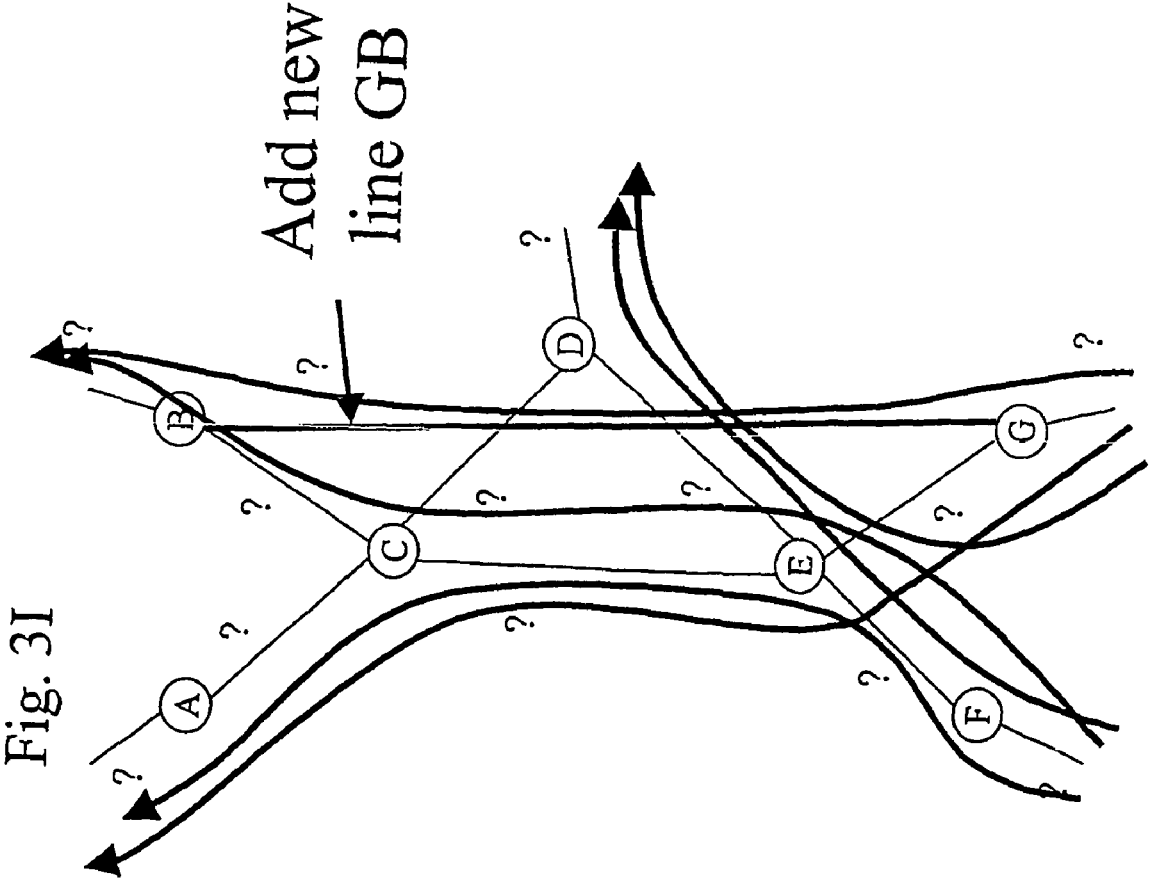

Referring now to FIG. 3I, the question is how the traffic data would look like if we add a new link between nodes G and B. In this example we have not enough information or constraints to derive an exact value for the traffic on the new link GB. As already shown with reference to FIG. 3D, we are able to derive an interval for the link traffic between GB, which now tells us that the flow is between 20 and 35. With this knowledge and the measurements of the traffic in the initial network, we can also derive link traffic intervals for the links EG, CE and BC, as given in FIG. 3J.

The traffic flow optimiser in embodiments of the present invention uses measured traffic data from an initial network to derive traffic values for a modified scenario. The modified scenario might for example be a modified topology of the network or a modified routing procedure like the introduction of primary tunnels. These modified scenarios are for example used for network planning and resilience analysis. Other modified scenarios include a modified traffic load in the network, like for forecasting traffic.

The traffic values for the modified scenario are calculated using the same principles as explained above in the simplified example with reference to FIG. 3. In the example, the link traffic values for the modified links are expressed as a function of the measured traffic data in the initial network to derive a value for traffic over a certain link. More generally, relationships derived from the initial scenario are used to constrain the traffic values of the modified scenario. In the embodiments described below, we set up a traffic flow model or a constraint model is defined for calculating traffic in the modified scenario. Because generally the exact amount of traffic cannot be determined, we calculate an upper and lower bound of data traffic.

In the constraint model, the flow terms contain typically several node-to-node flows. Any link traffic which is not affected by a modification corresponds to the link traffic of that link in the initial unmodified network and is thus known accurately.

From the calculated flow data (i.e. values and/or intervals) we derive the utilisation of individual links in the modified network.

In the following we list some of the relationships used in the constraint model as examples:
the sum of all flows starting in a node in equal to the sum of all external traffic entering the node;
the sum of all flows ending in a node in equal to the sum of all external traffic having the node;
the sum of all flow through a link is equal to the total traffic on the link.

Other constraints will be given below, where we describe different embodiments of the traffic flow model in more detail. We also refer to the description of the constraint model for the traffic flow analysis in then applicant's patent application GB 0 028 848, filed on 27 Nov. 2000 (agent reference J42831GB). The set of constraints described therein can alternatively be used in the traffic flow model of the present invention.

The output variables of the traffic flow optimizer are the flows which are affected by the imposed modification. These variables are referred to as solution variables in the following. Objective functions are defined using linear programming methods to calculate the bounds for all solution variables.

The traffic flow optimiser can be used to analyse the results of a whole set of modifications. This is for example useful for a resilience analysis of a communications network where the service provider might want to ensure that the network has enough capacities to deal with the failure of any such link.

One possibility to handle such multiple modifications is of course to treat each modification individually and to get results for the traffic values for each modification individually. However, the traffic flow optimiser according to one embodiment of the present invention also allows handling a set of modifications simultaneously. In this case the optimiser performs the routing process for each modification considered (if necessary) and produces the solution variables for each modification.

After all modification scenarios have been considered, the optimiser produces a list of solution variables, which is then used in the traffic flow model. In this list all solution variables are only listed once, so redundancies are removed. The set of modifications are then handled simultaneously in the traffic flow model. Possible outputs are a set of consistent values for all solution variables, which gives a solution to all constraints considered. Alternatively, or in addition, the modifications can also be handled one by one in the model, the output of the TFM is then a set of solution variable values or intervals for all modification considered.

The traffic flow optimiser also allows to handle a plurality of measured data sets. In the planning of a network change or in a resilience analysis, it is often desired to take into account multiple traffic data sets. In this way we do not restrict ourselves to the use of one particular data set which was collected at one particular time interval in the network considered. Instead, multiple data sets collected at different times may be used in one analysis. This is important as the traffic may considerably differ at different times. The results obtained in this way are thus much more consistent and meaningful. In case of a resilience analysis, if an utilisation problem is detected for the some network failure in all data sets, i.e. to all times considered in the analysis, then this points out a much more serious problem compared to a situation where the problem occurs in one data set only.

We analyse the multiple data sets independently and then combine the results. In this way we keep all information about correlation between the different traffic values. However, this method requires running of the traffic flow model for each data set separately, which may be very resource-consuming, especially if we consider a great number of data sets. Alternatively, we combine the multiple data sets into one merged data set and run the traffic flow optimizer based on this merged data set. In this case we loose the correlation between the individual traffic data measurements. This has to be taken into account when setting up the constraints for the traffic flow model.

The measured traffic data may be inconsistent. As such inconsistencies affect the TFM, the data are corrected in embodiments of the present invention.

A reason for inconsistencies might for example be that some network data is lost (e.g. the collected data from a router is not transported through the network). Other reasons might be that the network configuration is wrong (e.g. the counter for the size of traffic on a given interface does not represent the size of that traffic) or that the network data from different router interfaces (in case of a router-router directed link) is not collected at the same time and results in slight differences of size.

The data are corrected using the measured raw data and constraints derived from the topology of the network and routing protocols. The following constraints may for example be used for error correction:
for each route, the total traffic coming in is equal to the total traffic going out;
for each link between the interface j of router i and the interface l of router k, then traffic data on the interface j from the router i is equal to the traffic data on the interface l directed to the router k.

If the constraints are fulfilled, i.e. if no error is detected, the input values are not corrected and the process continues. If an error is detected, then the error is minimised using the constraints and a minimisation procedure. Error variables are introduced, for example variables specifying the corrected traffic volume for every single node or an overall error correction. An objective function is built from the constraining relationships using linear programming.

Output of the correction procedure are the error variables. Using these variables, the measured data can be corrected such that they are consistent for the application of a constraint model.

The procedure of error correction is similar to those described in patent application GB 0 028 848. We refer to this document for further details.

Figure 4:
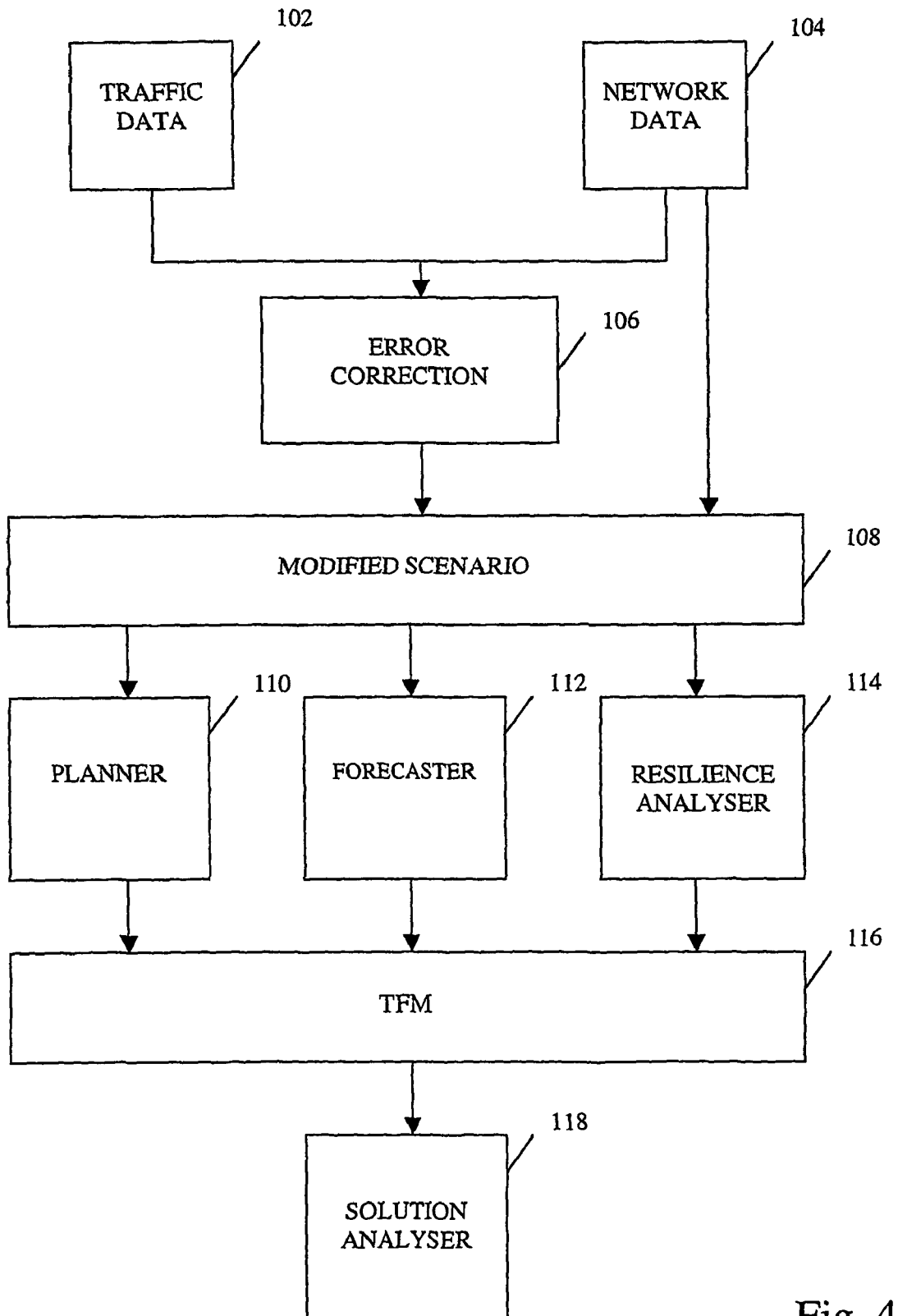
FIG. 4 is a flow chart diagram illustrating the individual steps of a traffic flow optimiser according to embodiments of the present invention.

Before the individual steps in a traffic flow optimiser will be set out in more detail reference is made to the flow chart diagram of FIG. 4. FIG. 4 summaries the steps of a traffic flow optimiser according to one embodiment of the present invention. Input to the optimiser is the measured traffic data, the topology of the network and the behaviour of the network, such as the results of performing a routing procedure (steps 102 and 104). The traffic data are corrected in step 106 such that a consistent data set is obtained. In step 108 a modified scenario is considered. The modified scenario may for example include a scenario for planning modified networks (110), for analysing resilience of a present or future network (112) or for forecasting traffic load (114). The topology of the initial and the modified network, if appropriate, is used to derive constraints for setting up a traffic flow model (116). The traffic flow model runs to determine intervals of a set of traffic flow solution variables in the modified network and/or one consistent solution for the set of modifications considered. In step 118 the output of TFM, i.e. the solution variable intervals, are analysed. The traffic flow optimiser may for example be used for selecting a suitable modification or set of modifications from the traffic flow intervals calculated for the different modifications considered. For the resilience analysis, the solution analyser may for example transform the solution variables into utilisation values.

The principle set out above can then be used in optimisation procedures like for example forecasting, resilience analysis, or network planning.

Forecasting

For forecasting traffic values in a given communications network, the network topology is not changed. However, the traffic load of the network is modified. Two different types of modification can be implemented. The first modification is a growth of the different end-to-end flows proportional to their original traffic. The second modification allows for additional traffic which can be specified to flow between certain nodes. However, the additional traffic should be allocated to nodes which have enough capacities for extending the traffic load (see the description for network planning below).

The traffic flow model is then set up such that for each node to node flow the correct growth factor is used and any additional flows are added. Output of the forecasting process are then modified traffic values (generally intervals of the link traffic) for which we can forecast the utilisation of the network if the traffic load growths. The constraints can be aggregated for groups of flows, e.g. for all flows between two PoPs. Often, we will obtain more accurate results this way.

Resilience Analysis

In order to study resilience of the network, the communications network is modified. Individual or multiple network elements, such as links between network nodes are removed in the analysis and the impact of such "failures" on the network are studied. Node failures are simulated by removing all links connecting to the corresponding node. For simulating a router node failure, the links inside a PoP and also the links connecting to another PoP can be removed. We can also treat any combination of link failures as a single failure cases, for example to analyze the effect of a fibre cut.

After the network modification, the routing procedure is performed in the modified network. The solution variables to be determined are defined. They correspond to the link traffic values in the modified network. Subsequently the TFM is set up using the constraints derived from the network topology and behaviour and the measured and corrected traffic data. As a result of the TFM upper and lower bounds are calculated for the desired solution variables and the utilisation of the derived links can be calculated. The optimiser further returns the amount of any un-routed traffic.

In such a resilience analysis a whole set of modifications to the network can be studied as described above. The information of the individual modification can be given as a list of network modifications, and the traffic flow optimiser runs through all given modifications automatically, giving a list of the desired network element utilisation and the un-routed traffic for each modification.

Network Planning

With the network planner the impact of new network elements, such as new links, can be studied.

The user can either specify to which node and/or interface of a node the new links should be connected. Alternatively, the user can specify one node of each PoP as the extension point, and the tool automatically selects the best point of connection for the new links.

Similar to the resilience analysis, routing is performed in the modified network, the TFM is set up and intervals are calculated for the desired solution variables. Again a list of selected modifications can be studied, either by handling each modification individually, or by combining multiple modifications.

In other embodiments, more specific queries can be answered by the traffic flow planner, the forecaster or the resilience analyser (110, 112 or 114 of FIG. 4). In this case the solution analyser 118 (or part of it) is incorporated into the traffic flow planner, the forecaster or the resilience analyser. Each of elements 110, 112, 114 can for example define a specific set of queries which is then calculated in the TFM using the complete set of constraints as described above.

In this case the step of calculating variables the utilisation of individual links are performed in the optimiser elements 110, 112 or 114. The solution variables are then no longer link traffic values, but variables like for example the utilisation of a link (in percent), the overall utilisation of the modified network (in percent), the maximal utilisation of any link in the network, the overloading of a link (in percent), the total volume of overloaded traffic or the volume of traffic in the original network that cannot be routed in the modified network.

As a consequence of using these variables the constraints used in the TFM are no longer linear. Such constraints are for example that the amount of overload for a link is the percentage of utilisation exceeding the utilisation limit or that the maximal utilisation is the maximum of all link utilisations in the network. We use linear approximation for these non-linear constraints.

The forecasting element 112 or planning element 110 may for example directly answer the following questions:

What is the utilisation of each link?

What is the overall utilisation of the network?

Are there any links that are overloaded?

The variables derived in such a case are the minimal and maximal utilisation of any link in the network (in percent), the overall utilisation of the network and the total amount of overloading in the network.

The queries of the resilience analyses may be specified as for example:

For each change, what is the utilisation of each link and which flows are lost, i.e. no longer transported in the network?

For each change, are there overloaded links and which flows are lost?

In a resilient planner, the query may for example be formulated as:

For each change, is the resulting network resilient and what is the utilisation of each link?

The traffic flow optimiser is also usefull in traffic engineering, for example for obtaining information about possible placements of primary tunnels.

Figure 5:
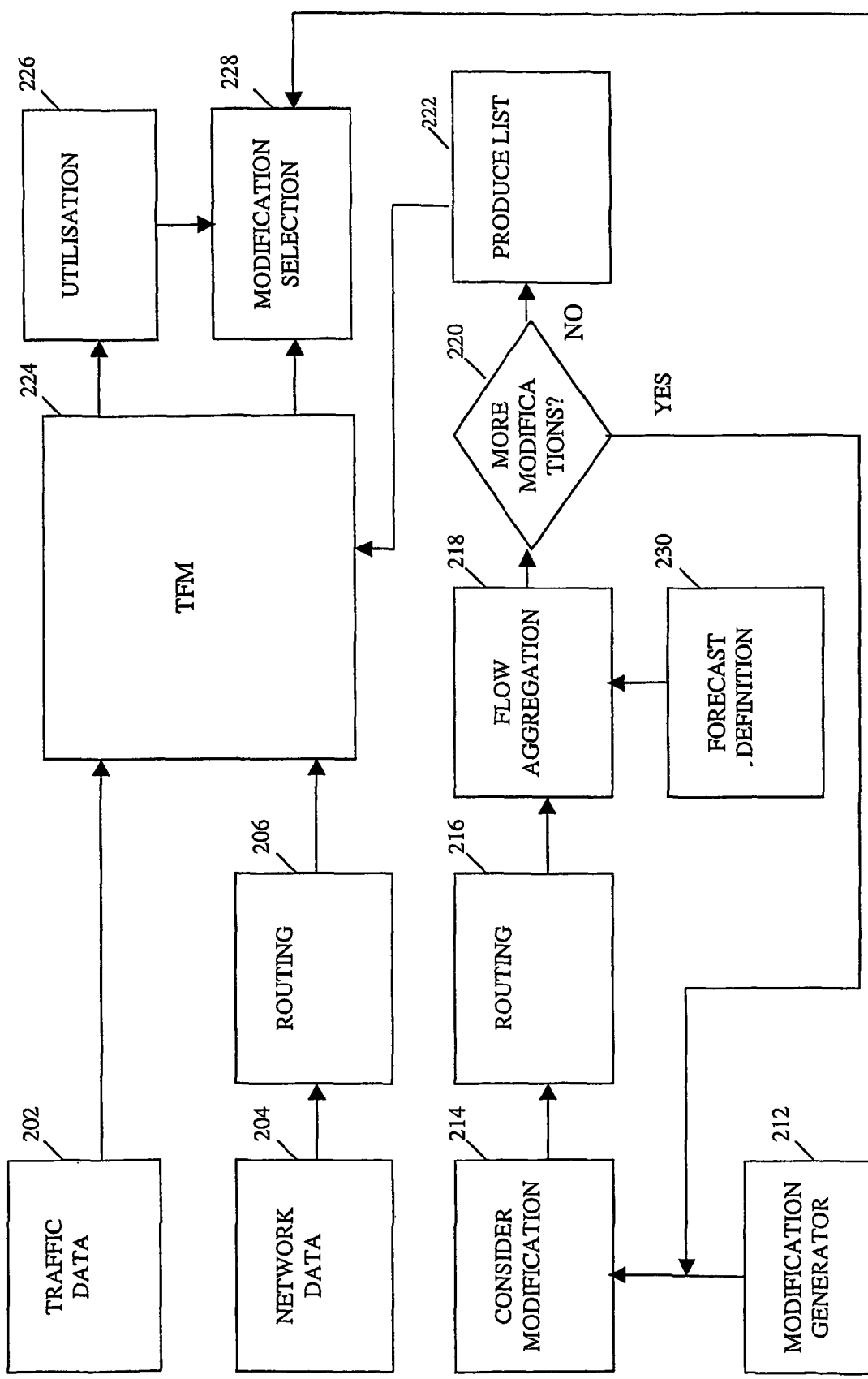
FIG. 5 is a flow chart diagram illustrating individual steps in a traffic flow optimiser according to one further embodiment of the present invention.

Referring now to FIG. 5, we describe how a traffic flow optimiser handles multiple network modifications like for example in a resilience analysis. In this embodiment, the traffic flow optimiser includes a modification generator 212. The generator 212 is implemented in software. It automatically generates a set of proposed modifications, like for example deleting every link in a network or every link in a particular set of links in a resilience analysis. Alternatively, the user may specify a set of modifications for a particular analysis. The set of modifications are then communicated to the planning or resilience element via an application programming interface (API). The optimiser element then considers a first modification of the network (step 214) as requested and routing is performed on the modified network in step 216. In step 218 the optimiser element performs flow aggregation and the required flow terms or solution variables are defined. In step 220 it is checked whether more modifications are to be carried out. If the answer is yes, then steps 214 to 220 are repeated, until no further modifications are required in step 220. If the answer is no, then the system continues with step 222.

In step 222 the optimiser element merges the required flow terms into a list. In this process any duplicates of flow terms are removed, such that a list of unique flow terms is provided to the TFM (step 224). In addition to this list, the TFM is also provided with information of the network topology and behaviour of the initial network and the measured traffic data (steps 202 to 206). Now the traffic flow model is set up by deriving constraints and building objection functions as described above. The output of the TFM is an upper and a lower bound for each of the solution queries. Alternatively, or in addition, one solution for all the solution variables can be calculated, which simultaneously satisfies all given constraints.

The resulting intervals or values are transformed into utilisation values of the links and/or values of the modified network in step 226. From these data the user or the system may select appropriate network modifications (step 228). If the TFM calculates directly solution variables like the utilisation variables and overflow values, the modification selector uses the values or intervals provided from the TFM. The modification generator of step 212 provides the necessary information for the selection of suitable or test modifications. If the traffic flow optimiser is used for forecasting traffic the definition of the modified scenario is given in step 230. As the network itself is not modified in this case, steps 214 and 216 are not performed and the modified traffic load is directly communicated to the optimiser in step 218. The modified traffic load is given as a percentage of the current traffic load.

In the following we describe different embodiments of the constraint model for the traffic flow optimiser in more detail.

As a first example, we give an example of a simple constraint model. In this simplified model, network nodes and routers are treated in the same way. External connections are not modelling explicitly. Only the total traffic volume into and out of a node to all external interfaces is taken into account.

In a second example, we give a further, more complete, example of a constraint model. We refer to this example as the full constraint model. In this case we distinguish between network nodes and routers. Node interfaces can be classified as interfaces of different groups if they belong to different customers.

In a third example, the full constraint model described in the second example is presented including error correction.

Subsequently the constraint model is described for the traffic flow optimiser according to one embodiment of the present invention. This description is based on the third example, i.e. the full constraint model including error correction. We present descriptions of the variables, constraints, approximations to non-linear constraints and solution variables used in this embodiment. Specific queries for a forecaster, a resilience analysis, a planner and also a resilience planner are given.

In a further embodiment of the present invention, we describe a traffic flow model, which is especially useful for large networks. In this model we introduce additional approximations. As a result, the overall number of variables to be calculated is reduced. The remaining variables are approximated in this model.

Simple Constraint Model 3.1 Constants

We start by defining the constants that we use to describe the network, its routing and the traffic loads in the network.

Definition 3.1 Nodes is the set of all nodes in the network. The number of nodes is denoted by n. Indices i, j, k, $k_x$, l and $l_x$ refer to nodes.

Definition 3.2 Pops is the set of all PoPs in the network. The number of PoPs is denoted by r. Indices p and q refer to PoPs. Each PoP is a set of nodes, and each node belongs to exactly one PoP.

Definition 3.3 The function pop: i ↦ p maps the node index i to a PoP index p.

Definition 3.4 Lines is the set of all node pairs kl so that a directed line exists between nodes k and l in the network. The number of lines in the network is denoted by m.

Definition 3.5 The constant $t_{kl}$ is the consistent traffic volume on the directed line between from node k to node l.

Definition 3.6 The constant $c_i^{in}$ is the sum of all consistent traffic volumes for external traffic into node i.

Definition 3.7 The constant $c_i^{out}$ is the sum of all consistent traffic volumes for external traffic out of node i.

Definition 3.8 The constant $R_{kl}$ is the set of all node pairs ij so that the flow from node i to node j is (partially) routed through line kl.

Definition 3.9 The constant $r_{ij}^{kl}$ is a number between 0 and 1 which describes which fraction of the flow from node i to node j is routed through line kl. A value 0 indicates that the flow is not routed through line kl.

Definition 3.10 The constant $p_{ij}^{pq}$ is either 0 or 1 and indicates whether the flow from node i to node j is a flow from PoP p to PoP q, i.e. i ∈ p and j ∈ q.

Lemma 3.1 We have that $$\forall\, i, j \in \text{Nodes}: \sum_{\substack{p \in Pops \\ q \in Pops}} p_{ij}^{pq} = 1$$

holds for all nodes i and j.

3.2 Variables

We now describe the variables of our model. The first set, the flow variables, are used to define flows in the network consistently. It is the second set, the solution variables, that we are really interested in. These solution variables are defined as sums of flow variables.

Definition 3.11 The non-negative variable $f_{ij}$ describes the flow from node i to node j. These variables are called flow variables.

There are $n^2$ variables of this type.

Definition 3.12 The non-negative variable $s_{pq}$ describes the flow from PoP p to PoP q. These variables are called solution variables.

There are $r^2$ variables of this type.

3.3 Constraints

We now list the constraints used in our minimal model. The names of the constraints are taken from the "RiskWise II Constraint Model" document.

Constraint 3.1 (flow_external(2)) The constraint states that the sum of all flows starting in a node is equal to the sum of all external traffic entering the node.

$$\forall\, i \in \text{Nodes}: \sum_{j \in \text{Nodes}} f_{ij} = c_i^{in}$$

We have n constraints of this type.

Constraint 3.2 (flow_external(1)) The constraint states that the sum of all flows ending in a node is equal to the sum of all external traffic leaving the node.

$$\forall\, j \in \text{Nodes}: \sum_{i \in \text{Nodes}} f_{ij} = c_j^{out}$$

We have n constraints of this type.

Constraint 3.3 (traffic_contribution_equal) The constraint states that the sum of all flows through a line is equal to the traffic on the line.

$$\forall\, kl \in \text{Lines}: \sum_{ij \in R_{kl}} r_{ij}^{kl} * f_{ij} = t_{kl}$$

We have m constraints of this type.

Constraint 3.4 (solution_term(1)) The constraint states that the flow between two PoPs is equal to the sum of all flows between nodes which belong to the first and second PoP.

$$\forall\, p, q \in \text{Pops}: s_{pq} = \sum_{\substack{i \in p \\ j \in q}} f_{ij}$$

We have $r^2$ constraints of this type.

3.4 Matrix

[1]The matrix form of the problem is defined by the set of equations $$M * \begin{pmatrix} \begin{pmatrix} f_{11} \\ f_{12} \\ \vdots \\ f_{nn} \end{pmatrix} \}n^2 \\ \begin{pmatrix} s_{11} \\ s_{12} \\ \vdots \\ s_{rr} \end{pmatrix} \}r^2 \end{pmatrix} = \begin{pmatrix} \begin{pmatrix} c_1^{in} \\ \vdots \\ c_n^{in} \end{pmatrix} \}n \\ \begin{pmatrix} c_1^{out} \\ \vdots \\ c_n^{out} \end{pmatrix} \}n \\ \begin{pmatrix} t_{k_1 l_1} \\ \vdots \\ t_{k_m l_m} \end{pmatrix} \}m \\ \begin{pmatrix} 0 \\ \vdots \\ 0 \end{pmatrix} \}r^2 \end{pmatrix}$$

[1]This section can be skipped on a first reading.

The matrix M is defined as $$\begin{pmatrix}
1 & 1 & \cdots & 1 & & & & 0 & 0 & \cdots & 0 & & & & \\
0 & 0 & \cdots & 0 & & & & 0 & 0 & \cdots & 0 & & & & \\
\vdots & \vdots & \cdots & \vdots & & \cdots & & \vdots & \vdots & \cdots & \vdots & & & 0 & \\
0 & 0 & \cdots & 0 & & & & 1 & 1 & \cdots & 1 & & & & \\
1 & 0 & \cdots & 0 & & & & 1 & 0 & \cdots & 0 & & & & \\
0 & 1 & \cdots & 0 & & & & 0 & 1 & \cdots & 0 & & & & \\
\vdots & \vdots & \ddots & \vdots & & \cdots & & \vdots & \vdots & \ddots & \vdots & & & 0 & \\
0 & 0 & \cdots & 1 & & & & 0 & 0 & \cdots & 1 & & & & \\
r_{11}^{k_1 l_1} & r_{12}^{k_1 l_1} & \cdots & r_{1n}^{k_1 l_1} & & & & r_{n1}^{k_1 l_1} & r_{n2}^{k_1 l_1} & \cdots & r_{nn}^{k_1 l_1} & & & & \\
r_{11}^{k_2 l_2} & r_{12}^{k_2 l_2} & \cdots & r_{1n}^{k_2 l_2} & & & & r_{n1}^{k_2 l_2} & r_{n2}^{k_2 l_2} & \cdots & r_{nn}^{k_2 l_2} & & & & \\
\vdots & \vdots & \ddots & \vdots & & \cdots & & \vdots & \vdots & \ddots & \vdots & & & 0 & \\
r_{11}^{k_m l_m} & r_{12}^{k_m l_m} & \cdots & r_{1n}^{k_m l_m} & & & & r_{n1}^{k_m l_m} & r_{n2}^{k_m l_m} & \cdots & r_{nn}^{k_m l_m} & & & & \\
p_{11}^{11} & p_{12}^{11} & \cdots & p_{1n}^{11} & & & & p_{n1}^{11} & p_{n2}^{11} & \cdots & p_{nn}^{11} & -1 & 0 & \cdots & 0 \\
p_{11}^{12} & p_{12}^{12} & \cdots & p_{1n}^{12} & & \cdots & & p_{n1}^{12} & p_{n2}^{12} & \cdots & p_{nn}^{12} & 0 & -1 & \cdots & 0 \\
\vdots & \vdots & \ddots & \vdots & & & & \vdots & \vdots & \ddots & \vdots & \vdots & \vdots & \ddots & \vdots \\
p_{11}^{rr} & p_{12}^{rr} & \cdots & p_{1n}^{rr} & & & & p_{n1}^{rr} & p_{n2}^{rr} & \cdots & p_{nn}^{rr} & 0 & 0 & \cdots & -1
\end{pmatrix}$$

The constraints are arranged in the sequence 1. flow_external(2)
2. flow_external(1)
3. traffic_contribution_equal
4. solution_term(1)

The matrix has $2n+m+r^2$ lines and $n^2+r^2$ columns.

Remember that only one $p_{ij}^{pq}$ in each column has the value 1, all others are 0. This means that $100/r^2$ (CWG: 11) percent of the $p_{ij}^{pq}$ values are non zero.

Experiments with the CWG network have shown that most lines carry at least n flows, with some carrying 1000 flows. This means that roughly 5-10% of the $r_{ij}^{hl}$ values are non-zero.

To highlight the structure of the matrix, we can also show it as the combination of multiple smaller matrices.

$$\begin{pmatrix} ONE_1 & ONE_2 & \ldots & ONE_n & 0 \\ I & I & \ldots & I & 0 \\ R_1 & R_2 & \ldots & R_n & 0 \\ P_1 & P_2 & \ldots & P_n & -I \end{pmatrix}$$

with the smaller matrices $$ONE_x = \begin{pmatrix} 0 & 0 & \ldots & 0 \\ \vdots & \vdots & \ldots & \vdots \\ 0 & 0 & \ldots & 0 \\ 1 & 1 & \ldots & 1 \\ 0 & 0 & \ldots & 0 \\ \vdots & \vdots & \ldots & \vdots \\ 0 & 0 & \ldots & 0 \end{pmatrix}$$

where the line of ones is line x. The size of this matrix is n×n.

$$I = \begin{pmatrix} 1 & 0 & \ldots & 0 \\ 0 & 1 & \ldots & 0 \\ \vdots & \vdots & \ddots & \vdots \\ 0 & 0 & \ldots & 1 \end{pmatrix}$$

$$R_x = \begin{pmatrix} r_{x1}^{k_1 l_1} & r_{x2}^{k_1 l_1} & \ldots & r_{xn}^{k_1 l_1} \\ r_{x1}^{k_2 l_2} & r_{x2}^{k_2 l_2} & \ldots & r_{xn}^{k_2 l_2} \\ \vdots & \vdots & \ddots & \vdots \\ r_{x1}^{k_m l_m} & r_{x2}^{k_m l_m} & \ldots & r_{xn}^{k_m l_m} \end{pmatrix}$$

The size of this matrix is m×n.

$$P_x = \begin{pmatrix} p_{x1}^{11} & p_{x2}^{11} & \ldots & p_{xn}^{11} \\ p_{x1}^{12} & p_{x2}^{12} & \ldots & p_{xn}^{12} \\ \vdots & \vdots & \ddots & \vdots \\ p_{x1}^{rr} & p_{x2}^{rr} & \ldots & p_{xn}^{rr} \end{pmatrix}$$

The size of this matrix is $r^2$×n.

Lemma 3.2 We find that $P_x = P_y$ if pop(x)=pop(y).

3.5 Objective Functions

As result of the flow analysis we want to have lower and upper bounds for all solution variables. This implies the objective functions $$\min s_{pq}$$

and $$\max s_{pq}$$

which are run independently for all pairs of PoPs p and q. This means that we have to run $2 \ast r^2$ optimization queries. We can reduce this value by checking if a particular solution variable $s_{pq}$ has a value 0 in one of the other optimization runs. If that happens, we do not have to check it for minimum value.

Full Constraint Model

The main difference between the simple constraint model as set out above and the full constraint model as described in the following is that we distinguish between the different types of external interfaces. We also allow a separation of customers interfaces into groups 1 and 2. If the constraint model is used to perform an analysis of the traffic between PoPs, group 1 will contain all customer interfaces of a node and group 2 will be empty. For other analyses, some interfaces belong to group 1 and others to group 2.

4.1 Constants

We start by defining the constants that we use to describe the network, its routing and the traffic loads in the network.

Definition 4.1 Nodes is the set of all nodes in the network. The number of nodes is denoted by n. Indices i, j, k, $k_x$, l and $l_x$ refer to nodes.

Definition 4.2 Routers is the set of all routers in the network. The number of nodes is denoted by $n_r$.

Definition 4.3 Nets is the set of all network nodes in the network. The number of nodes is denoted by $n_n$.

Lemma 4.1 We have

Nodes=Routers ∪ Nets and

Routers ∩ Nets=0

Definition 4.4 Pops is the set of all PoPs in the network. The number of PoPs is denoted by r. Indices p and q refer to PoPs. Each PoP is a set, of nodes, and each node belongs to exactly on PoP.

Definition 4.5 The function pop: i ↦ p maps the node index i to a PoP index p.

Definition 4.6 Lines is the set of all node pairs kl so that a directed line exists between nodes k and l in the network. The number of lines in the network is denoted by m.

Definition 4.7 The value o denotes the number of interconnection lines in the network.

Definition 4.8 The constant $h_i$ denotes the number of interface groups found at node i. The value $h_i$ is equal to the number of interconnection lines attached to node i plus 2.

Lemma 4.2 The total number of groups in the network is $$\sum_{i \in Nodes} h_i = 2n + o$$

Definition 4.9 The constant $t_{kl}$ is the consistent traffic volume on the directed line from node k to node l.

Definition 4.10 The constant $c_i^{in}$ is the sum of all consistent traffic volumes for external traffic into node i.

Definition 4.11 The constant $c_{ia}^{in}$ is the sum of all consistent traffic volumes for external traffic which belongs to group a into node i.

Definition 4.12 The constant $c_i^{out}$ is the sum of all consistent traffic volumes for external traffic out of node i.

Definition 4.13 The constant $c_{ia}^{out}$ is the sum of all consistent traffic volumes for external traffic which belongs to group a out of node i.

Lemma 4.3 We have that $$\forall i \in \text{Nodes}: c_i^{in} = \sum_{1 \leq a \leq h_i} c_{ia}^{in} \text{ and}$$

$$\forall i \in \text{Nodes}: c_i^{out} = \sum_{1 \leq a \leq h_i} c_{ia}^{out}$$

Definition 4.14 The constant $R_{kl}$ is the set of all node pairs ij so that the flow from node i to node j is (partially) routed through line kl.

Definition 4.15 The constant $r_{ij}^{kl}$ is a number between 0 and 1 which describes which fraction of the flow between nodes i and j is routed through line kl. A value 0 indicates that the flow is not routed through line kl.

Definition 4.16 The constant $p_{ij}^{pq}$ is either 0 or 1 and indicates whether the flow between nodes i and j is a flow between PoPs p and q, i.e. i ∈ p and j ∈ q.

Lemma 4.4 We have that $$\forall i, j \in \text{Nodes}: \sum_{\substack{p \in Pops \\ q \in Pops}} p_{ij}^{pq} = 1$$

holds for all nodes i and j.

4.2 Variables

We now describe the variables of our model. The first set, the flow variables, are used to define flows in the network consistently. The second set splits the flows in even more details, so that we can attach more detailed constraints. But it is the last set, the solution variables, that we are really interested in. These solution variables are defined as sums of flow variables.

Definition 4.17 The non-negative variable $f_{ij}$ describes the flow from node i to node j. These variables are called flow variables.

There are $n^2$ variables of this type.

Definition 4.18 The non-negative variable $g_{ij}^{ab}$ describes the flow from group a of node i to group b of node j. These variables are called flow group variables.

Lemma 4.5 There are $4n^2+4on+o^2$ variables $g_{ij}^{ab}$.

Definition 4.19 The non-negative variable $s_{pq}$ describes the flow from PoP p to PoP q. These variables are called solution variables.

There are $r^2$ variables of this type.

4.3 Constraints

We now list the constraints used in our model. The names of the constraints are taken from the "RiskWise II Constraint Model" document.

Constraint 4.1 (flow_external(2)) The constraint states that the sum of all flows starting in a node is equal to the sum of all external traffic entering the node.

$$\forall i \in \text{Nodes}: \sum_{j \in Nodes} f_{ij} = c_i^{in}$$

We have n constraints of this type.

Constraint 4.2 (flow_external(1)) The constraint states that the sum of all flows ending in a node is equal to the sum of all external traffic leaving the node.

$$\forall j \in \text{Nodes}: \sum_{i \in Nodes} f_{ij} = c_j^{out}$$

We have n constraints of this type.

Constraint 4.3 (traffic_contribution_equal) The constraint states that the sum of all flows through a line is equal to the traffic on the line.

$$\forall kl \in \text{Lines}: \sum_{ij \in R_{kl}} T_{ij}^{kl} * f_{ij} = t_{kl}$$

We have m constraints of this type.

Constraint 4.4 (solution_term(1)) The constraint states that the flow between two PoPs is equal to the sum of all flows between nodes which belong to the first and second PoP.

$$\forall p, q \in \text{Pops}: s_{pq} = \sum_{\substack{i \in p \\ j \in q}} f_{ij}$$

We have $r^2$ constraints of this type.

Constraint 4.5 (flow_f_g_sum) The total flow between two nodes is equal to the sum of the flows between the interface groups at the nodes.

$$\forall i \in \text{Nodes}, j \in \text{Nodes}: f_{ij} = \sum_{\substack{1 \le a \le h_i \\ 1 \le b \le h_j}} g_{ij}^{ab}$$

There are $n^2$ constraints of this type.

Constraint 4.6 (flow_g_limit a) The sum of all flows from an interface group at a node is equal to the consistent traffic into this group.

$$\forall i \in \text{Nodes}, 1 \le a \le h_i: c_{ia}^{in} = \sum_{\substack{j \in Nodes \\ 1 \le b \le h_j}} g_{ij}^{ab}$$

There are 2n+o constraints of this type.

Constraint 4.7 (flow_g_limit b) The sum of all flows to some interface group at a node is equal to the consistent traffic out of this group.

$$\forall j \in \text{Nodes}, 1 \le b \le h_j: c_{jb}^{out} = \sum_{\substack{i \in Nodes \\ 1 \le a \le h_i}} g_{ij}^{ab}$$

There are 2n+o constraints of this type.

Constraint 4.8 (empty_flow) There are no flows between interconnection lines.

$$\forall i \in \text{Nodes}, j \in \text{Nodes}, 3 \le a \le h_i, 3 \le b \le h_j: g_{ij}^{ab}=0$$

There are $o^2$ constraints of this type. These constraints are solved by pre-processing, setting some variable to zero.

Constraint 4.9 (inverse_g_flow) The flow between nodes i and j is limited by the flow in the inverse direction.

$$\forall i \in \text{Nodes}, j \in \text{Nodes}, 1 \le a \le h_i, 1 \le b \le h_j: g_{ij}^{ab} \le L * g_{ji}^{ba}$$

There are 2n+o constraints of this form.

Constraint 4.10 (self_flow_net) There is no flow within a network node.

$$\forall i \in \text{Nets}: f_{ii}=0$$

There are $n_n$ constraints of this form. These constraints are solved by pre-processing, setting some variable to zero.

Lemma 4.6 Constraint 4.1 and 4.2 are implied by the constraints 4.5, 4.6 and 4.7 and are therefore redundant.

Proof: We show that constraint 4.1 is implied by adding up all equations 4.6 for a node i:

$$c_i^{in} \stackrel{Lemma 4.3}{=} \sum_{1 \le a \le h_i} c_{ia}^{in} \quad (1)$$

-continued $$\overset{Constraint4.6}{=} \sum_{1 \le a \le h_i} \sum_{\substack{j \in Nodes \\ 1 \le b \le h_j}} g_{ij}^{ab} \quad (2)$$

$$= \sum_{j \in Nodes} \sum_{\substack{1 \le a \le h_i \\ 1 \le b \le h_j}} g_{ij}^{ab} \quad (3)$$

$$\overset{Constraint4.5}{=} \sum_{j \in Nodes} f_{ij} \quad (4)$$

4.4 Matrix

[2] The matrix form of the problem is defined by the set of equations and inequalities $$M * \begin{pmatrix} \begin{pmatrix} f_{11} \\ f_{12} \\ \vdots \\ f_{nn} \end{pmatrix} \} n^2 \\ \begin{pmatrix} s_{11} \\ s_{12} \\ \vdots \\ s_{rr} \end{pmatrix} \} r^2 \\ \begin{pmatrix} g_{11}^{11} \\ g_{11}^{12} \\ \vdots \\ g_{11}^{h_1 h_1} \\ g_{12}^{11} \\ \vdots \\ g_{nn}^{h_n h_n} \end{pmatrix} \} (2n+o)^2 \end{pmatrix} \le \begin{pmatrix} \begin{pmatrix} c_1^{in} \\ \vdots \\ c_n^{in} \\ c_1^{out} \\ \vdots \\ c_n^{out} \end{pmatrix} \} n \\ \begin{pmatrix} t_{k_1 l_1} \\ \vdots \\ t_{k_m l_m} \end{pmatrix} \} m \\ \begin{pmatrix} 0 \\ \vdots \\ 0 \end{pmatrix} \} r^2 \\ \begin{pmatrix} 0 \\ \vdots \\ 0 \end{pmatrix} \} n^2 \\ \begin{pmatrix} c_{11}^{in} \\ c_{12}^{in} \\ \vdots \\ c_{1h_1}^{in} \\ \vdots \\ c_{nh_n}^{in} \end{pmatrix} \} 2n+o \\ \begin{pmatrix} c_{11}^{out} \\ c_{12}^{out} \\ \vdots \\ c_{1h_1}^{out} \\ \vdots \\ c_{nh_n}^{out} \end{pmatrix} \} 2n+o \\ \begin{pmatrix} 0 \\ \vdots \\ 0 \end{pmatrix} \} 2n+o \end{pmatrix}$$

[2] This section can be skipped on a first reading.

The last $2n+o$ lines are inequalities, the rest are equations. The constraints are arranged in the sequence 1. flow_external(2)
2. flow_external(1)
3. traffic_contribution_equal
4. solution_term(1)
5. flow_f_g_sum
6. flow_g_limit a
7. flow_g_limit b
8. inverse_g_flow The matrix M is defined as $$\begin{pmatrix} ONE_1 & ONE_2 & \dots & ONE_n & 0 & 0 \\ I & I & \dots & I & 0 & 0 \\ R_1 & R_2 & \dots & R_n & 0 & 0 \\ P_1 & P_2 & \dots & P_n & -I & 0 \\ & & -I & & 0 & H \\ & & 0 & & & \hat{G} \\ & & 0 & & & \check{G} \\ & & 0 & & & V \end{pmatrix}$$

The matrix has $2n+m+r^2+n^2+3(2n+o)$ lines and $n^2+r^2+(2n+o)^2$ columns. We now describe the different sub parts of the matrix.

$$ONE_x = \begin{pmatrix} 0 & 0 & \dots & 0 \\ \vdots & \vdots & \dots & \vdots \\ 0 & 0 & \dots & 0 \\ 1 & 1 & \dots & 1 \\ 0 & 0 & \dots & 0 \\ \vdots & \vdots & \dots & \vdots \\ 0 & 0 & \dots & 0 \end{pmatrix}$$

where the line of ones is line x. The size of this matrix is n×n.

$$I = \begin{pmatrix} 1 & 0 & \dots & 0 \\ 0 & 1 & \dots & 0 \\ \vdots & \vdots & \ddots & \vdots \\ 0 & 0 & \dots & 1 \end{pmatrix}$$

$$R_x = \begin{pmatrix} r_{x1}^{k_1 l_1} & r_{x2}^{k_1 l_1} & \dots & r_{xn}^{k_1 l_1} \\ r_{x1}^{k_2 l_2} & r_{x2}^{k_2 l_2} & \dots & r_{xn}^{k_2 l_2} \\ \vdots & \vdots & \ddots & \vdots \\ r_{x1}^{k_m l_m} & r_{x2}^{k_m l_m} & \dots & r_{xn}^{k_m l_m} \end{pmatrix}$$

The size of this matrix is m×n.

$$P_x = \begin{pmatrix} p_{x1}^{11} & p_{x2}^{11} & \dots & p_{xn}^{11} \\ p_{x1}^{12} & p_{x2}^{12} & \dots & p_{xn}^{12} \\ \vdots & \vdots & \ddots & \vdots \\ p_{x1}^{rr} & p_{x2}^{rr} & \dots & p_{xn}^{rr} \end{pmatrix}$$

The size of this matrix is $r^2$×n.

Lemma 4.7 We find that $P_x = P_y$ if pop(x)=pop(y).

The sub matrix H has the form $$H = \begin{pmatrix} \frac{h_1 * h_1}{111} & & & 0 \\ & \frac{h_1 * h_2}{11} & & \\ & & \ddots & \\ 0 & & & \frac{h_n * h_n}{111} \end{pmatrix}$$

with $n^2$ lines and $(2n+o)^2$ columns.

Definition 4.20 Let $g_x$: i×a ↦ x be the bijection which maps tuples i×a to an index x.

Let $g_y$: i×j×a×b ↦ y be the bijection which maps tuples i×j×a×b to an index y.

Let $g_x^{-1}$ and $g_y^{-1}$ be their inverses.

The matrix $\hat{G}$ consists of elements $\hat{g}_{xy}$ which are defined by the formula $$\hat{g}_{xy} = \begin{cases} 1 & \text{if } g_x^{-1}(x) = i \times a \text{ and } g_y^{-1}(y) = i \times j \times a \times b \\ 0 & \text{otherwise} \end{cases}$$

The matrix $\check{G}$ consists of elements $\check{g}_{xy}$ which are defined by the formula $$\check{g}_{xy} = \begin{cases} 1 & \text{if } g_x^{-1}(x) = j \times b \text{ and } g_y^{-1}(y) = i \times x \times j \times a \times b \\ 0 & \text{otherwise} \end{cases}$$

Finally, the matrix V consists of values 0, 1 and −L. Each line and column contains one entry with value 1 and one entry with value −L. The values 1 are on the main diagonal. Formally, the matrix entries $v_{xy}$ are defined as $$v_{xy} = \begin{cases} 1 & \text{if } x = y \text{ and } g_y^{-1}(x) \neq i \times i \times a \times a \\ -L & \text{if } x \neq y \text{ and} \\ & g_y^{-1}(x) = i \times j \times a \times b \text{ and} \\ & g_y^{-1}(y) = j \times i \times b \times a \\ 0 & \text{otherwise} \end{cases}$$

4.5 Objective Functions

As result of the flow analysis we want to have lower and upper bounds for all solution variables. This implies the objective functions $$\min s_{pq}$$

and $$\max s_{pq}$$

which are run independently for all pairs of PoPs p and q. This means that we have to run $2*r^2$ optimization queries. We can reduce this value by checking if a particular solution variable $s_{pq}$ has a value 0 in one of the other optimization runs. If that happens, we do not have to check it for minimum value.

Full Constraint Model Including Error Correction

We now present the fill constraint model including error correction.

5.1 Constants

We start by defining the constants that we use to describe the network, its routing and the traffic loads in the network.

Definition 5.1 Nodes is the set of all nodes in the network. The number of nodes is denoted by n. Indices i, j, k, $k_x$, l and $l_x$ refer to nodes.

Definition 5.2 Routers is the set of all routers in the network. The number of nodes is denoted by $n_r$.

Definition 5.3 Nets is the set of all network nodes in the network. The number of nodes is denoted by $n_n$.

Lemma 5.1 We have $$\text{Nodes} = \text{Routers} \cup \text{Nets}$$

and $$\text{Routers} \cap \text{Nets} = \emptyset$$

Definition 5.4 Pops is the set of all PoPs in the network. The number of PoPs is denoted by r. Indices p and q refer to PoPs. Each PoP is a set of nodes, and each node belongs to exactly on PoP.

Definition 5.5 The function pop: i ↦ p maps the node index i to a PoP index p.

Definition 5.6 Lines is the set of all node pairs kl so that a directed line exists between nodes k and l in the network. The number of lines in the network is denoted by m.

Definition 5.7 The value o denotes the number of interconnection lines in the network.

Definition 5.8 The constant $h_i$ denotes the number of interface groups found at node i. The value $h_i$ is equal to the number of interconnection lines attached to node i plus 2.

Lemma 5.2 The total number of groups in the network is $$\sum_{i \in \text{Nodes}} h_i = 2n + o$$

Definition 5.9 The constant $u_{kl}^{source}$ is the observed traffic volume entering the directed line from node k to node l.

Definition 5.10 The constant $u_{kl}^{dest}$ is the observed traffic volume leaving the directed line from node k to node l.

Definition 5.11 The constant $a_{ia}^{in}$ is the sum of all observed traffic volumes for external traffic which belongs to group a into node i.

Definition 5.12 The constant $a_{ia}^{out}$ is the sum of all observed traffic volumes for external traffic which belongs to group a out of node i.

Definition 5.13 The constant $R_{kl}$ is the set of all node pairs ii so that the flow from node i to node j is (partially) routed through line kl.

Definition 5.14 The constant $r_{ij}^{kl}$ is a number between 0 and 1 which describes which fraction of the flow between nodes i and j is routed through line kl. A value 0 indicates that the flow is not routed through line kl.

Definition 5.15 The constant $p_{ij}^{pq}$ is either 0 or 1 and indicates whether the flow between nodes i and j is a flow between PoPs p and q, i.e. i ∈ p and j ∈ q.

Lemma 5.3 We have that $$\forall i, j \in \text{Nodes}: \sum_{\substack{p \in \text{Pops} \\ q \in \text{Pops}}} p_{ij}^{pq} = 1$$

holds for all nodes i and j.

5.2 Variables

We now describe the variables of our model. The first set, the flow variables, are used to define flows in the network consistently. The second set splits the flows in even more details, so that we can attach more detailed constraints. But it is the last set, the solution variables, that we are really interested in. These solution variables are simply defined as sums of flow variables.

Definition 5.16 The variable $v_{kl}^{source}$ is the error correction applied to the observed traffic volume entering the directed line from node k to node l. This variable may be negative.

There are m variables of this type.

Definition 5.17 The variable $v_{kl}^{dest}$ is the error correction applied to the observed traffic volume leaving the directed line between nodes i and j. This variable may be negative.

There are m variables of this type.

Definition 5.18 The non-negative variable $\bar{t}_{kl}$ is the consistent traffic volume on the directed line between nodes i and j.

There are m variables of this type.

Definition 5.19 The non-negative variable $\bar{c}_{ia}^{in}$ is the sum of all consistent traffic volumes for external traffic which belongs to group a into node i.

There are 2n+o variables of this type.

Definition 5.20 The non-negative variable $\bar{c}_{ia}^{out}$ is the sum of all consistent traffic volumes for external traffic which belongs to group a out of node i.

There are 2n+o variables of this type.

Definition 5.21 The variable $e_{ia}^{in}$ is the error correction applied to the sum of all consistent traffic volumes for external traffic which belongs to group a into node i. This variable may be negative.

There are 2n+o variables of this type.

Definition 5.22 The variable $e_{ia}^{out}$ is the error correction applied to the sum of all consistent traffic volumes for external traffic which belongs to group a out of node i. This variable may be negative.

There are 2n+o variables of this type.

Definition 5.23 The non-negative variable $f_{ij}$ describes the flow from node i to node j. These variables are called flow variables.

There are $n^2$ variables of this type.

Definition 5.24 The non-negative variable $g_{ij}^{ab}$ describes the flow from group a of node i to group b of node j. These variables are called flow group variables.

Lemma 5.4 There are $4n^2+4on+o^2$ variables $g_{ij}^{ab}$.

Definition 5.25 The non-negative variable $s_{pq}$ describes the flow from PoP p to PoP q. These variables are called solution variables.

There are $r^2$ variables of this type.

5.3 Constraints

We now list the constraints used in our model. The names of the constraints are taken from the "RiskWise II Constraint Model" document.

Constraint 5.1 (interface_error_correction a) The corrected traffic volume value is equal to the observed value plus the error correction applied.

$$\forall i \in \text{Nodes}, 1 \leq a \leq h_i: \bar{c}_{ia}^{in}=a_{ia}^{in}+e_{ia}^{in}$$

There are 2n+o constraints of this type.

Constraint 5.2 (interface_error_correction b) The corrected traffic volume value is equal to the observed value plus the error correction applied.

$$\forall i \in \text{Nodes}, 1 \leq a \leq h_i: \bar{c}_{ia}^{out}=a_{ia}^{in}+e_{ia}^{out}$$

There are 2n+o constraints of this type.

Constraint 5.3 (interface_error_correction c) The corrected traffic volume value on a line is equal to the observed value plus the error correction applied.

$$\forall kl \in \text{Lines}: \bar{t}_{kl}=u_{kl}^{source}+v_{kl}^{source}$$

There are m constraints of this type.

Constraint 5.4 (interface_error_correction d) The corrected traffic volume value on a line is equal to the observed value plus the error correction applied.

$$\forall kl \in \text{Lines}: \bar{t}_{kl}=u_{kl}^{dest}+v_{kl}^{dest}$$

There are m constraints of this type.

Constraint 5.5 (node_octet_sum) The sum of all corrected traffic in to a node is equal to the sum of all corrected traffic out of the node.

$$\forall i \in \text{Nodes}: \sum_{1 \leq a \leq h_i} \bar{c}_{ia}^{in} + \sum_{ki \in Lines} \bar{t}_{ki} = \sum_{1 \leq a \leq h_i} \bar{c}_{ia}^{out} + \sum_{il \in Lines} \bar{t}_{il}$$

There are n constraints of this type.

Constraint 5.6 (traffic_contribution_equal) The constraint states that the sum of all flows through a line is equal to the traffic on the line.

$$\forall kl \in \text{Lines}: \sum_{ij \in R_{kl}} r_{ij}^{kl} * f_{ij} = \bar{t}_{kl}$$

We have m constraints of this type.

Constraint 5.7 (solution_term(1)) The constraint states that the flow between two PoPs is equal to the sum of all flows between nodes which belong to the first and second PoP.

$$\forall p, q \in \text{Pops}: s_{pq} = \sum_{\substack{i \in p \\ j \in q}} f_{ij}$$

We have $r^2$ constraints of this type.

Constraint 5.8 (flow_f_g_sum) The total flow between two nodes is equal to the sum of the flows between the interface groups at the nodes.

$$\forall i \in \text{Nodes}, j \in \text{Nodes}: f_{ij} = \sum_{\substack{1 \leq a \leq h_i \\ 1 \leq b \leq h_j}} g_{ij}^{ab}$$

There are $n^2$ constraints of this type.

Constraint 5.9 (flow_g_limit a) The sum of all flows from an interface group at a node is equal to the consistent traffic into this group.

$$\forall i \in \text{Nodes}, 1 \leq a \leq h_i: \bar{c}_{ia}^{in} = \sum_{\substack{j \in Nodes \\ 1 \leq b \leq h_j}} g_{ij}^{ab}$$

There are 2n+o constraints of this type.

Constraint 5.10 (flow_g_limit b) The sum of all flows to some interface group at a node is equal to the consistent traffic out of this group.

$$\forall j \in \text{Nodes}, 1 \leq b \leq h_j: \bar{c}_{jb}^{out} = \sum_{\substack{i \in Nodes \\ 1 \leq a \leq h_i}} g_{ij}^{ab}$$

There are 2n+o constraints of this type.

Constraint 5.11 (empty_flow) There are no flows between interconnection lines.

$$\forall\, i \in Nodes, j \in Nodes, 3 \le a \le h_i, 3 \le b \le h_j\colon g_{ij}^{ab}=0$$

There are $o^2$ constraints of this type. These constraints are solved by preprocessing, setting some variable to zero.

Constraint 5.12 (inverse_g_flow) The flow between nodes i and j is limited by the flow in the inverse direction.

$$\forall\, i \in Nodes, j \in Nodes, 1 \le a \le h_i, 1 \le b \le h_j\colon g_{ij}^{ab} \le L * g_{ji}^{ba}$$

There are 2n+o constraints of this form.

Constraint 5.13 (self_flow_net) There is no flow within a network node.

$$\forall\, i \in Nets\colon f_{ii}=0$$

There are $n_n$ constraints of this form. These constraints are solved by preprocessing, setting some variable to zero.

5.4 Objective Functions

The error correction model first performs an optimization to find a minimal error correction which provides us with a consistent data set to perform the flow analysis. The objective function for the error correction is $$\min b_1 * \sum_{i \in Nodes} |e_{ia}^{in}| + b_1 * \sum_{i \in Nodes} |e_{ia}^{out}| + \quad (5)$$

$$b_2 * \sum_{kl \in Lines} |v_{kl}^{source}| + b_2 * \sum_{kl \in Lines} |v_{kl}^{dest}| + \quad (6)$$

$$b_3 * \sum_{i \in Nets} \tilde{c}_{i1}^{in} + b_3 * \sum_{i \in Nets} \tilde{c}_{i1}^{out} \quad (7)$$

-continued $$b_4 * \sum_{\substack{i \in Nodes \\ j \in Nodes \\ 1 \le a \le 2 \\ 1 \le b \le 2}} g_{ij}^{ab} + \quad (8)$$

$$b_5 * \sum_{\substack{i \in Nodes \\ j \in Nodes \\ 1 \le a \le h_i \\ 3 \le b \le h_j}} g_{ij}^{ab} + \quad (9)$$

$$b_5 * \sum_{\substack{i \in Nodes \\ j \in Nodes \\ 3 \le a \le h_i \\ 1 \le b \le 2}} g_{ij}^{ab} \quad (10)$$

As result of the flow analysis we want to have lower and upper bounds for all solution variables. This implies the objective functions $$\min s_{pq}$$

and $$\max s_{pq}$$

which are run independently for all pairs of PoPs p and q. This means that we have to run $2*r^2$ optimization queries. We can reduce this value by checking if a particular solution variable $s_{pq}$ has a value 0 in one of the other optimization runs. If that happens, we do not have to check it for minimum value.

5.5 Use of Variables/Constants

The following table shows the use of the different variable and constant types in the constraints and the objective functions.

| | Variables | | | | | | | Constants | | | | |
|---|---|---|---|---|---|---|---|---|---|---|---|---|
| | $v_{kl}^{source/dest}$ | $\tilde{t}_{kl}$ | $\tilde{c}_{ia}^{out/in}$ | $e_{ia}^{out/in}$ | $f_{ij}$ | $g_{ij}^{ab}$ | $s_{pq}$ | $u_{kl}^{source/dest}$ | $a_{ia}^{in/out}$ | $R_{kl}$ | $r_{ij}^{kl}$ | $p_{ij}^{pq}$ |
| 5.1 | | | x | x | | | | x | | | | |
| 5.2 | | | x | x | | | | x | | | | |
| 5.3 | x | x | | | | | | x | | | | |
| 5.4 | x | x | | | | | | x | | | | |
| 5.5 | x | x | | | | | | | | | | |
| 5.6 | | x | | | x | | | | | (x) | x | |
| 5.7 | | | | | x | | x | | | | | (x) |
| 5.8 | | | | | x | x | | | | | | |
| 5.9 | | | x | | | x | | | | | | |
| 5.10 | | | x | | | x | | | | | | |
| 5.11 | | | | | | x | | | | | | |
| 5.12 | | | | | | x | | | | | | |
| 5.13 | | | | | x | | | | | | | |
| Obj1 | x | | x | x | | x | | | | | | |
| Obj2 | | | | | | | x | | | | | |

Optimizer Model

In the following we describe the constraint model for the traffic flow optimizer according to one embodiment of the present invention. The model is based on the full constraint model including error correction.

For the optimizer model we always study two networks scenarios. One is the original scenario, in which we have made traffic measurements, the other is a modified one. The modifications can be an arbitrary number of additions, changes or deletions from the original network topology or the network topology. For the modified scenario we want to calculate certain indicator values, which tell us about the impact of the modification. In the following formalism, all symbols related to the modified scenario are marked with a bar, like so: $\bar{f}_{ij}$.

6.1 Constants

We start by defining the constants that we use to describe the modified network, its routing and the traffic loads in the network. We only define those items that we will need in the model.

Definition 6.1 $\overline{Nodes}$ is the set of all nodes in the network. The number of nodes is denoted by $\bar{n}$. Indices i, j, k, $k_x$, l and $l_x$ refer to nodes.

Definition 6.2 $\overline{Routers}$ is the set of all routers in the network. The number of nodes is denoted by $\bar{n}_r$.

Definition 6.3 $\overline{Nets}$ is the set of all network nodes in the network. The number of nodes is denoted by $\bar{n}_n$.

Lemma 6.1 We have $$\overline{Nodes} = \overline{Routers} \cup \overline{Nets}$$

and $$\overline{Routers} \cap \overline{Nets} = \emptyset$$

Definition 6.4 $\overline{Lines}$ is the set of all node pairs kl so that a directed line exists between nodes k and l in the network. The number of lines in the network is denoted by $\bar{m}$.

Definition 6.5 The constant $\bar{R}_{kl}$ is the set of all node pairs ij so that the flow from node i to node j is (partially) routed through line kl.

Definition 6.6 The constant $\bar{r}_{ij}^{kl}$ is a number between 0 and 1 which describes which fraction of the flow between nodes i and j is routed through line kl. A value 0 indicates that the flow is not routed through line kl.

Definition 6.7 The constant $\overline{bw}_{kl}$ describes the bandwidth of the line kl.

Definition 6.8 The constant $\overline{nc}_{ij}$ is the routing cost of a flow from node i to node j. The value indicates how much network resources are used to transport the flow from node i to node j.

Lemma 6.2

$$\forall i, j \in \overline{Nodes}: \overline{nc}_{ij} = \sum_{kl \in \overline{Lines}} \bar{r}_{ij}^{kl}$$

Lemma 6.3

$$\forall i \in \overline{Nodes}: \overline{nc}_{ii} = 0$$

$$\forall i,j \in \overline{Nodes}, i \neq j: \overline{nc}_{ij} \geq 1$$

Observation: Normally, the value $\overline{nc}_{ij}$ is an integer, but this is not always the case.

Definition 6.9 The constant $\bar{w}_{ij}$ is the factor of increase of the flow from node i to node j from the original network to the modified network.

Definition 6.10 The constant $\bar{z}_{ij}$ is an additional flow from node i to node j in the modified network.

Definition 6.11 The constant $\bar{U}$ describes the utilization limit for all lines in the network.

Definition 6.12 The constant $\bar{L}$ is the set of all node pairs ii so that the flow from i to j can not be routed in the modified network.

6.2 Variables

Definition 6.13 The non-negative variable $\bar{t}_{kl}$ is the consistent traffic volume on the directed line between nodes k and l.

There are $\bar{m}$ variables of this type. They are not explicitly represented in the model.

Definition 6.14 The non-negative variable $\bar{f}_{ij}$ describes the flow from node i to node j. These variables are called flow variables.

There are $\bar{n}^2$ variables of this type. They are not explicitly represented in the model.

Definition 6.15 The non-negative variable $\bar{d}_{kl}$ is the utilization (in percent) of the directed line between nodes k and l.

There are $\bar{m}$ variables of this type.

Definition 6.16 The non-negative variable $\bar{D}$ is the overall utilization (in percent) of the modified network.

There is only one variable of this type.

Definition 6.17 The non-negative variable $\bar{d}_{min}$ is the minimal utilization of any line in the network.

There is only one variable of this type.

Definition 6.18 The non-negative variable $\bar{d}_{max}$ is the maximal utilization of any line in the network.

There is only one variable of this type.

Definition 6.19 The non-negative variable $\bar{o}_{kl}$ describes the percentage of overloading of line kl. If the line is not overloaded, the value is 0.

There are $\bar{m}$ variables of this type.

Definition 6.20 The non-negative variable $\bar{h}_{kl}$ describes the volume of overloaded traffic on line kl. If the line is not overloaded, the value is 0.

There are $\bar{m}$ variables of this type.

Definition 6.21 The non-negative variable $\bar{O}$ describes the total amount of overloading in the network.

There is only one variable of this type.

Definition 6.22 The non-negative variable $\bar{H}$ describes the total volume of overloaded traffic in the network.

There is only one variable of this type.

Definition 6.23 The non-negative variable $\overline{Lost}$ describes the volume of traffic in the original network that can not be routed in the modified network. If all traffic can be routed, the value is 0.

There is only one variable of this type.

6.3 Constraints

Constraint 6.1 (traffic_contribution_equal) The constraint states that the sum of all flows through a line is equal to the traffic on the line.

$$\forall kl \in \overline{Lines}: \sum_{ij \in \bar{R}_{kl}} \bar{r}_{ij}^{kl} * \bar{f}_{ij} = \bar{t}_{kl}$$

We have m constraints of this type. They are not explicitly represented in the model.

Constraint 6.2 The constraint states that the utilization is the traffic divided by the bandwidth.

$$\forall kl \in \overline{Lines}: \bar{d}_{kl} = 100 * \frac{\bar{t}_{kl}}{\overline{bw}_{kl}}$$

The constraints are not explicitly represented in the model.

Constraint 6.3 The overall utilization is calculated by the total traffic divided by the sum of all bandwidth in the network.

$$\overline{D} = 100 * \frac{\sum_{kl \in \overline{Lines}} \overline{t}_{kl}}{\sum_{kl \in \overline{Lines}} \overline{bw}_{kl}}$$

The constraint is not explicitly represented in the model.

Constraint 6.4 (flow_assumption) The constraint states how flows in the original and in the modified network are related.

$$\forall i,j \in \overline{Nodes}: \overline{f}_{ij} = \overline{w}_{ij} * f_{ij} + \overline{z}_{ij}$$

The constraints are not explicitly represented in the model.

Constraint 6.5 The lost traffic is the sum of all flows of the original network that can not be routed in the modified network.

$$\overline{Lost} = \sum_{ij \in L} f_{ij}$$

Constraint 6.6 The amount of overload for a line is the percentage of utilization exceeding the utilization limit.

$$\forall kl \in \overline{Lines}: \overline{o}_{kl} = \max(0, \overline{d}_{kl} - \overline{U})$$

The constraints are not explicitly represented in the model.

Constraint 6.7 The total amount of overload is the sum of the overload on each line.

$$\overline{O} = \sum_{kl \in \overline{Lines}} \overline{o}_{kl}$$

The constraint not explicitly represented in the model.

Constraint 6.8 The volume of overloading of a line is the volume of the traffic exceeding the utilization limit.

$$\forall kl \in \overline{Lines}: \overline{h}_{kl} = \max\left(0, \overline{t}_{kl} - \frac{\overline{U} * \overline{bw}_{kl}}{100}\right)$$

The constraints are not explicitly represented in the model.

Constraint 6.9 The total volume of overloading is equal to the sum of the overloaded volumes on each line.

$$\overline{H} = \sum_{kl \in \overline{Lines}} \overline{h}_{kl}$$

The constraint is not explicitly represented in the model.

Constraint 6.10 The minimal utilization is the minimum of all line utilizations in the network.

$$\overline{d}_{min} = \min_{kl \in \overline{Lines}} \{d_{kl}\}$$

The constraint is not explicitly represented in the model.

Constraint 6.11 The maximal utilization is the maximum of all line utilizations in the network.

$$\overline{d}_{max} = \max_{kl \in \overline{Lines}} \{d_{kl}\}$$

The constraint is not explicitly represented in the model.

6.4 Approximations

Constraints 6.6 to 6.11 are non-linear. Linear approximations can be defined as follows. Variables defined through the linear approximation are marked with '. We typically will be able to calculate such approximations more easily in our program.

Constraint 6.12 replaces constraint 6.6

$$\forall kl \in \overline{Lines}: \overline{o}'_{kl} \geq \overline{d}_{kl} - \overline{U} \tag{11}$$

$$\overline{o}'_{kl} \geq 0 \tag{12}$$

Constraint 6.13 replaces constraint 6.7

$$\overline{O}' = \sum_{kl \in \overline{Lines}} \overline{o}'_{kl}$$

Constraint 6.14 replaces constraint 6.8

$$\forall kl \in \overline{Lines}: \quad \overline{h}'_{kl} \geq \overline{t}_{kl} - \frac{\overline{U} * \overline{bw}_{kl}}{100} \tag{13}$$

$$\overline{h}'_{kl} \geq 0 \tag{14}$$

Constraint 6.15 replaces constraint 6.9

$$\overline{H}' = \sum_{kl \in \overline{Lines}} \overline{h}'_{kl}$$

Constraint 6.16 replaces constraint 6.10

$$\forall kl \in \overline{Lines}: \overline{d}'_{min} \leq \overline{d}_{kl}$$

Constraint 6.17 replaces constraint 6.11

$$\forall kl \in \overline{Lines}: \overline{d}'_{max} \geq \overline{d}_{kl}$$

6.5 General Results

Theorem 6.1 The utilization of a line in the modified network can be expressed as a linear function of node to node flows in the original network.

Proof:

$$\forall kl \in \overline{Lines}: \quad \overline{d}_{kl} = 100 * \frac{\overline{t}_{kl}}{\overline{bw}_{kl}} \tag{15}$$

$$= \frac{100}{\overline{bw}_{kl}} \sum_{ij \in \overline{R}_{kl}} \overline{r}^{kl}_{ij} \overline{f}_{ij} \tag{16}$$

$$= \frac{100}{\overline{bw}_{kl}} \sum_{ij \in \overline{R}_{kl}} \overline{r}^{kl}_{ij} (\overline{w}_{ij} * f_{ij} + \overline{z}_{ij}) \tag{17}$$

$$= \sum_{ij \in \overline{R}_{kl}} \underbrace{\frac{100 * \overline{r}_{ij}^{kl} \overline{z}_{ij}}{\overline{bw}_{kl}}}_{constant} + \sum_{ij \in \overline{R}_{kl}} \underbrace{\frac{100 * \overline{r}_{ij}^{kl} \overline{w}_{ij}}{\overline{bw}_{kl}}}_{constant} f_{ij} \qquad (18)$$

Theorem 6.2 The overall network utilization in the modified network can be expressed as a linear function of node to node flows in the original network.

Proof:

$$\overline{D} = 100 * \frac{\sum_{kl \in \overline{Lines}} \overline{t}_{kl}}{\sum_{kl \in \overline{Lines}} \overline{bw}_{kl}} \qquad (19)$$

$$= \frac{100}{\sum_{kl \in \overline{Lines}} \overline{bw}_{kl}} \sum_{kl \in \overline{Lines}} \sum_{ij \in \overline{R}_{kl}} \overline{r}_{ij}^{kl} \overline{f}_{ij} \qquad (20)$$

$$= \frac{100}{\sum_{kl \in \overline{Lines}} \overline{bw}_{kl}} \sum_{kl \in \overline{Lines}} \sum_{ij \in \overline{R}_{kl}} \overline{r}_{ij}^{kl} (\overline{w}_{ij} f_{ij} + \overline{z}_{ij}) \qquad (21)$$

$$= \frac{100}{\sum_{kl \in \overline{Lines}} \overline{bw}_{kl}} \sum_{kl \in \overline{Lines}} \sum_{ij \in \overline{R}_{kl}} \overline{r}_{ij}^{kl} \overline{z}_{ij} + \qquad (22)$$
$$\frac{100}{\sum_{kl \in \overline{Lines}} \overline{bw}_{kl}} \sum_{kl \in \overline{Lines}} \sum_{ij \in \overline{R}_{kl}} \overline{r}_{ij}^{kl} \overline{w}_{ij} f_{ij}$$

$$= \frac{100}{\sum_{kl \in \overline{Lines}} \overline{bw}_{kl}} \sum_{kl \in \overline{Lines}} \sum_{i,j \in Nodes} \overline{r}_{ij}^{kl} \overline{z}_{ij} + \qquad (23)$$
$$\frac{100}{\sum_{kl \in \overline{Lines}} \overline{bw}_{kl}} \sum_{kl \in \overline{Lines}} \sum_{i,j \in Nodes} \overline{r}_{ij}^{kl} \overline{w}_{ij} f_{ij}$$

$$= \frac{100}{\sum_{kl \in \overline{Lines}} \overline{bw}_{kl}} \sum_{i,j \in Nodes} \sum_{kl \in \overline{Lines}} \overline{r}_{ij}^{kl} \overline{z}_{ij} + \qquad (24)$$
$$\sum_{i,j \in Nodes} \left( \frac{100 * \overline{w}_{ij}}{\sum_{kl \in \overline{Lines}} \overline{bw}_{kl}} \sum_{kl \in \overline{Lines}} \overline{r}_{ij}^{kl} \right) * f_{ij}$$

$$= \underbrace{\frac{100}{\sum_{kl \in \overline{Lines}} \overline{bw}_{kl}} \sum_{i,j \in Nodes} \overline{nc}_{ij} \overline{z}_{ij} +}_{constant} \qquad (25)$$
$$\sum_{i,j \in Nodes} \underbrace{\frac{100 * \overline{w}_{ij} * \overline{nc}_{ij}}{\sum_{kl \in \overline{Lines}} \overline{bw}_{kl}}}_{constant} * f_{ij}$$

Lemma 6.4

$$\sum_{kl \in \overline{Lines}} t_{kl} = \sum_{i,j \in Nodes} nc_{ij} * f_{ij}$$

Intuitively, the lemma states that the traffic in the network is completely explained in terms of the node to node flows, and that the contribution of a flow to the overall traffic is its volume multiplied by the routing cost of the flow.

Theorem 6.3 Assume the same topology and routing in the original and the modified network. If the flows in the modified network are multiples of the original flows by the same factor, then we will forecast a growth of utilization on each line and of the overall utilization by the same factor.

Formally, assume Nodes=$\overline{\text{Nodes}}$, Lines=$\overline{\text{Lines}}$, $bw_{kl}=\overline{bw}_{kl}$ and $r_{ij}^{kl}=\overline{r}_{ij}^{kl}$. Further assume $\overline{f}_{ij}=x*f_{ij}$. Then we have that $\overline{d}_{kl}=x*d_{kl}$ and $\overline{D}=x*D$.

Proof: Under the given assumptions, we have that $$\overline{D} = \sum_{i,j \in Nodes} \frac{100 * x * \overline{nc}_{ij}}{\sum_{kl \in \overline{Lines}} \overline{bw}_{kl}} * f_{ij} \qquad (26)$$

$$= x * 100 * \frac{\sum_{i,j \in Nodes} \overline{nc}_{ij} * f_{ij}}{\sum_{kl \in \overline{Lines}} \overline{bw}_{kl}} \qquad (27)$$

$$= x * 100 * \frac{\sum_{i,j \in Nodes} nc_{ij} * f_{ij}}{\sum_{kl \in Lines} bw_{kl}} \qquad (28)$$

$$= x * 100 * \frac{\sum_{kl \in Lines} t_{kl}}{\sum_{kl \in Lines} bw_{kl}} \qquad (29)$$

$$= x * D \qquad (30)$$

Similarily, we have that $$\forall\, kl \in \overline{\text{Lines}}: \quad \overline{d}_{kl} = 100 * \frac{\overline{t}_{kl}}{\overline{bw}_{kl}} \qquad (31)$$

$$= 100 * \frac{\sum_{ij \in \overline{R}_{kl}} \overline{r}_{ij}^{kl} * \overline{f}_{ij}}{\overline{bw}_{kl}} \qquad (32)$$

$$= 100 * \frac{\sum_{ij \in R_{kl}} r_{ij}^{kl} * x * f_{ij}}{bw_{kl}} \qquad (33)$$

$$= x * 100 * \frac{\sum_{ij \in R_{kl}} r_{ij}^{kl} * f_{ij}}{bw_{kl}} \qquad (34)$$

$$= x * 100 * \frac{t_{kl}}{bw_{kl}} \qquad (35)$$

$$= x * d_{kl} \qquad (36)$$

Corollary 6.1 Assume the same topology, routing and flows in the original and in the modified network. Then the forecasted line utilization will be equal to the corrected utilization in the original networks

Theorem 6.4 Assume the same flows in the original and the modified network. If $\overline{nc}_{ij} \leq nc_{ij}$ for all flows, then $\overline{D} \leq D$.

6.6 Approximation Results

We now present some results on the linear approximations defined above. We typically can use them to find either the minimum or maximum value of the approximated value, but not to find both.

Theorem 6.5 We can use the linear approximation $\bar{o}'_{kl}$ to find the minimum value for the variable $\bar{o}_{kl}$.

$$\forall\, kl \in \overline{\text{Lines}}: \quad \min \bar{o}_{kl} = \min_{LP} \bar{o}'_{kl}$$

The maximum value of $\bar{o}'_{kl}$ is unbounded and therefore useless. But we can get the maximal value directly from Theorem 6.6

$$\forall\, kl \in \overline{\text{Lines}}: \quad \max \bar{o}_{kl} = \max_S \left(0, \max_{LP} \bar{d}'_{kl} - U\right)$$

Theorem 6.7 We can use the linear approximation $\overline{O}'$ to find the minimum value for the variable $\overline{O}$.

$$\min \overline{O} = \min_{LP} \overline{O}'.$$

The maximum value of $\overline{O}'$ is unbounded and therefore useless.

Theorem 6.8 We can find an upper bound for the maximum value of $\overline{O}$ by the sum of the maxima of the $\bar{o}_{kl}$ values.

$$\max \overline{O} \leq \sum_{kl \in \overline{\text{Lines}}} \max_{LP} \bar{o}_{kl}$$

The maximum value for $\bar{o}_{kl}$ can be determined if we know the maximum value for each $\bar{d}_{kl}$.

Theorem 6.9

$$\max_{LP} \sum_{kl \in \overline{\text{Lines}}} (\bar{d}_{kl} - U) \leq \max \overline{O}$$

This is a fairly trivial bound, and typically will be rather weak. We can strengthen the bound by restricting the sum to those lines that can be overloaded in the worst case.

Theorem 6.10

$$\max_{LP} \sum_{kl\, s.t.\, \bar{o}_{kl} > 0} (\bar{d}_{kl} - U) \leq \max \overline{O}$$

This again assumes that we know the maximum value for each of the $\bar{d}_{kl}$ variables.

We can define similar results for the other approximations:

$$\min \bar{d}_{max} = \min_{LP} \bar{d}'_{max} \quad \text{Theorem 6.11}$$

$$\max \bar{d}_{max} = \max_{kl \in \overline{\text{Lines}}} \left\{ \max_{LP} \bar{d}_{kl} \right\} \quad \text{Theorem 6.12}$$

$$\max \bar{d}_{min} = \max_{LP} \bar{d}'_{min} \quad \text{Theorem 6.13}$$

$$\max \bar{d}_{min} = \min_{kl \in \overline{\text{Lines}}} \left\{ \min_{LP} \bar{d}_{kl} \right\} \quad \text{Theorem 6.14}$$

$$\forall\, kl \in \overline{\text{Lines}}: \quad \min \bar{h}_{kl} = \min_{LP} \bar{h}'_{kl} \quad \text{Theorem 6.15}$$

$$\min \overline{H} = \min_{LP} \overline{H}' \quad \text{Theorem 6.16}$$

$$\max \overline{H} \leq \sum_{kl \in \overline{\text{Lines}}} \max_{LP} \bar{h}_{kl} \quad \text{Theorem 6.17}$$

$$\max_{LP} \sum_{kl \in \overline{\text{Lines}}} \left( \bar{t}_{kl} - \frac{U * b\bar{w}_{kl}}{100} \right) \leq \max \overline{H} \quad \text{Theorem 6.18}$$

$$\max_{LP} \sum_{kl\, s.t.\, \bar{o}_{kl} > 0} \left( \bar{t}_{kl} - \frac{U * b\bar{w}_{kl}}{100} \right) \leq \max \overline{H} \quad \text{Theorem 6.19}$$

The following tables summarize the approximation results. For each value, they state how many LP queries must be processed. A value m indicates that all line utilizations have to be computed. As a reminder, we also give a brief statement of the meaning for each indicator.

| Variable(s) | LP queries | Meaning |
| --- | --- | --- |
| min D | 1 | the minimum overall utilization of the network for any flow distribution |
| max D | 1 | the maximum overall utilization of the network for any flow distribution |
| min O | 1 | minimum total amount of overloading in the best case |
| max O | m + 1 | approximation only bounds for the largest percentage of overloading in the worst case scenario |
| min H | 1 | minimum total volume of overloading in the best case |
| max H | m + 1 | approximation only bounds for the largest volume of overloading in the worst case scenario |
| min Lost | 1 | the minimum volume of all flows of the original network that can not be routed in the modified one |
| max Lost | 1 | the maximum volume of all flows of the original network that can not be routed in the modified one |
| L | none | the flows of the original network that can not be routed in the modified one |
| min $d_{max}$ | 1 | the maximum utilization of any line under the best assumptions about the flow distribution |
| max $d_{max}$ | m | the maximum utilization of any line for the worst case scenario |
| min $d_{min}$ | m | the minimum utilization of any line in the worst case scenario |
| max $d_{min}$ | 1 | the minimum utilization of any line under the best assumptions about flow distribution |
| min $\bar{t}_{kl}$ | m | minimum traffic volume for each line |
| max $\bar{t}_{kl}$ | m | maximum traffic volume for each line |
| min $d_{kl}$ | m | minimum utilization of each line (follows from $\bar{t}_{kl}$) |
| max $d_{kl}$ | m | maximum utilization of each line (follows from $\bar{t}_{kl}$) |
| min $\bar{o}_{kl}$ | m | minimum amount of overloading for each line (follows from $\bar{t}_{kl}$) |
| max $\bar{o}_{kl}$ | m | maximum amount of overloading for each line (follows from $\bar{t}_{kl}$) |
| min $h_{kl}$ | m | minimum volume of overloading for each line (follows from $\bar{t}_{kl}$) |
| max $h_{kl}$ | m | maximum volume of overloading for each line (follows from $\bar{t}_{kl}$) |

6.7 A Simpler Approximation

If we are satisfied with lower and/or upper bounds on the values for $\bar{t}_{kl}$, we can use the following approximation. The traffic on a line kl in the modified network can be expressed as $$\bar{t}_{kl} = \sum_{i,j \in Nodes} \bar{r}_{ij}^{kl} * \bar{f}_{ij}$$

Assuming that the set of nodes and the flows between them have not changed, we have that $$\bar{t}_{kl} = \sum_{i,j \in Nodes} \bar{r}_{ij}^{kl} * f_{ij}$$

On the other hand, the traffic on a line k'l' in the original network can be expressed as $$t_{k'l'} = \sum_{i,j \in Nodes} r_{ij}^{k'l'} * f_{ij}$$

If for all nodes i and j we have that $$\forall i, j \in Nodes: \bar{r}_{ij}^{kl} \overset{\leq}{\geq} r_{ij}^{k'l'}$$

we can bound $\bar{t}_{kl}$ with $t_{k'l'}$.

$$\bar{t}_{kl} \overset{\leq}{\geq} t_{k'l'}$$

With less justification, we could use the approximation $$\bar{t}_{kl} \overset{\leq}{\geq} u_{k'l'}^{source\ dest}$$

to find a simple a priori bound which only requires routing and some lookup routine, but does not require an LP run.

This method of approximation can be extended to sums of traffic on multiple lines in the original network, which can be used to bound the traffic on a line in the modified network. This may be useful if we are only interested in whether some line is overloaded or not, but do not care for actual utilization numbers.

6.8 Forecast

We now look at the different types of queries we encounter in the different optimizer modules. For each particular form of query, we note which variables can be used to answer it.

Given a topology, traffic data and a flow growth pattern. Possible queries to answer are:

6.8.1 What is the utilization of each line?

| Variable(s) | Comment |
|---|---|
| min/max $d_{kl}$ | needs 2m queries |

6.8.2 Are there any lines that are overloaded?

| Variable(s) | Comment |
|---|---|
| O > 0? | needs 2m queries ? |

6.8.3 What is the total utilization of the network?

| Variable(s) | Comment |
|---|---|
| min/max D | 2 queries |

6.9 Resilience

Given a topology, traffic data, a flow growth pattern and a set of network changes. Possible queries to answer are:

6.9.1 For each change, what is the utilization of each line and which flows are lost? What is the volume of each flow lost?

| Variable(s) | Comment |
|---|---|
| min/max $d_{kl}$ | needs 2m queries per change |
| L | obtained from routing |
| $\forall\ ij \in L$: min/max $f_{ij}$ | loss of precision probable; 2\|L\| queries per change |

6.9.2 For each change, what is the utilization of each line and which flows are lost? What is the total volume of the flows lost?

| Variable(s) | Comment |
|---|---|
| min/max $d_{kl}$ | needs 2m queries per change |
| L | obtained from routing |
| min/max Lost | 2 queries per change |

6.9.3 For each change, what is the utilization of each line and which flows are lost?

| Variable(s) | Comment |
|---|---|
| min/max $d_{kl}$ | needs 2m queries per change |
| L | obtained from routing |

6.9.4 For each change, are there overloaded lines and which flows are lost?

| Variable(s) | Comment |
|---|---|
| min/max O | needs 2m queries per change |
| L | obtained from routing |

6.9.5 For each change, what is the overall utilization of the network?

| Variable(s) | Comment |
|---|---|
| min/max D | 2 queries per change |

6.9.6 Is there a change so that some line is overloaded?

| Variable(s) | Comment |
|---|---|
| max{max O} | m + 1 queries per change |

6.9.7 Is there a change so that some flow is lost?

| Variable(s) | Comment |
|---|---|
| ∪ L | obtained from routing |

6.9.8 What is the worst case utilization of the network for any of the changes?

| Variable(s) | Comment |
|---|---|
| max{max D} | 2 queries per change |

6.9.9 What is the largest amount of traffic lost for any of the changes?

| Variable(s) | Comment |
|---|---|
| max{max Lost} | 2 queries per change |

6.10 Planner

Given a topology, traffic data, a flow growth pattern and a set of possible network changes. Possible queries to answer are:

6.10.1 For each change, what is the utilization of each line?

| Variable(s) | Comment |
|---|---|
| min/max $d_{kl}$ | needs 2m queries per change |

6.10.2 For each change, which lines are overloaded by how much?

| Variable(s) | Comment |
|---|---|
| min/max $\bar{o}_{kl}$ | needs 2m queries per change |

6.10.3 For each change, are there overloaded lines?

| Variable(s) | Comment |
|---|---|
| O > 0? | needs 2m queries per change ? |

6.10.4 Which change results in the smallest amount of overloading?

| Variable(s) | Comment |
|---|---|
| min{max O} | needs 2m queries per change ? |

6.10.5 Which change results in the smallest overall utilization?

| Variable(s) | Comment |
|---|---|
| min{D} | 2 queries per change |

6.10.6 Which is the subset of n changes which reduces overloading the most?

6.10.7 Which n changes to select one at a time to reduce overloading?

6.11 Resilient Planner

Given a topology, traffic data, a flow growth pattern, a set of possible network failures and a set of possible network changes. Possible queries to answer are:

6.11.1 For each change, is the resulting network resilient and what is the utilization of each line?

6.11.2 For each change, is the resulting network partially resilient and what is the utilization of each line?

6.11.3 Which change that does not worsen resilience results in the smallest amount of overloading?

6.11.4 Which change that does not worsen resilience results in the smallest overall utilization?

Partially resilience is defined compared to an existing situation. A network change is partially resilient compared to an original network if no additional line becomes overloaded and no additional traffic is lost.

A Scalable Version of the Constraint Model

In a further embodiment of the present invention, we describe a traffic flow constraint model using additional approximations. In this way the model is especially useful for large networks.

The models represented so far all have the disadvantage that we need $O(n^2)$ node-to-node flow variables. This is a basic limitation that restricts the number of networks for which the models can be used. We now present a way of relaxing the model so that we need fewer variables. The key idea is to introduce flow variables for only some of the node-to-node flows and to approximate the remaining flows. This will lead to weaker results, but it can be scaled to larger size by selecting fewer and fewer detailed flows.

Changes against the minimal model are marked with an arrow in the margin.

B.1 Constants

We start by defining the constants that we use to describe the network, its routing and the traffic loads in the network.

Definition B.1 Nodes is the set of all nodes in the network. The number of nodes is denoted by n. Indices i, j, k, $k_x$, l and $l_x$ refer to nodes.

Definition B.2 Pops is the set of all PoPs in the network. The number of PoPs is denoted by r. Indices p and q refer to PoPs. Each PoP is a set of nodes, and each node belongs to exactly one PoP.

Definition B.3 The function pop: i ↦ p maps the node index i to a PoP index p.

Definition B.4 Lines is the set of all node pairs kl so that a directed line exists between nodes k and l in the network. The number of lines in the network is denoted by m.

Definition B.5 The constant $t_{kl}$ is the consistent traffic volume on the directed line between from node k to node l.

Definition B.6 The constant $c_i^{in}$ is the sum of all consistent traffic volumes for external traffic into node i.

Definition B.7 The constant $c_i^{out}$ is the sum of all consistent traffic volumes for external traffic out of node i.

Definition B.8 The constant $R_{kl}$ is the set of all node pairs ij so that the flow from node i to node j is (partially) routed through line kl.

Definition B.9 The constant $r_{ij}^{kl}$ is a number between 0 and 1 which describes which fraction of the flow from node i to node j is routed through line kl. A value 0 indicates that the flow is not routed through line kl.

Definition B.10 The constant $p_{ij}^{pq}$ is either 0 or 1 and indicates whether the flow from node i to node j is a flow from PoP p to PoP q, i.e. i ∈ p and j ∈ q.

Lemma B.1 We have that $$\forall i, j \in \text{Nodes}: \sum_{\substack{p \in Pops \\ q \in Pops}} p_{ij}^{pq} = 1$$

holds for all nodes i and j.

Definition B.11 The constant Taken is a set of node pairs which represents the set of all selected node-to-node flows. We have that Taken ⊂ Nodes×Nodes. Entries in Taken are represented by node pairs $\overline{ij}$.

Definition B.12 The constant Find is a set of PoP pairs which represents the set of all selected PoP-to-PoP flows. We have that Find ⊂ Pops×Pops. Entries in Taken are represented by PoP pairs $\overline{pq}$.

B.2 Variables

We now describe the variables of our model. The first set, the flow variables, are used to define flows in the network consistently. It is the second set, the solution variables, that we are really interested in. These solution variables are defined as sums of flow variables.

Definition B.13 The non-negative variable $f_{ij}$ describes the flow from node i to node j with $\overline{ij}$ ∈ Taken. These variables are called flow variables.

There are |Taken| variables of this type.

Definition B.14 The non-negative variable $rest_i^{out}$ describes the sum of all node-to-node flows starting in node i which are not in the Taken set.

There are n variables of this type.

Definition B.15 The non-negative variable $rest_j^{in}$ describes the sum of all node-to-node flows ending in node j which are not in the Taken set.

There are n variables of this type.

Definition B.16 The non-negative variable $s_{pq}$ describes the flow from PoP p to PoP q with $\overline{pq}$ ∈ Find. These variables are called solution variables.

There are |Find| variables of this type.

B.3 Constraints

We now list the constraints used in our scalable model. The names of the constraints are taken from the "RiskWise II Constraint Model" document, but the constraints here are only approximations of the original constraints.

Constraint B.1 (flow_external(1)) The constraint states that the sum of all flows starting in a node is equal to the sum of all external traffic entering the node.

$$\forall i \in \text{Nodes}: \sum_{\substack{j \in Nodes \\ \overline{ij} \in Taken}} f_{ij} + rest_i^{out} = c_i^{in}$$

We have n constraints of this type.

Constraint B.2 The constraint states that the variable $rest_i^{out}$ of all non-taken flows starting in a node i is 0, if all flows starting in the node are in the Taken set.

$rest_i^{out} = 0$ if $\forall j \in$ Nodes: $\overline{ij} \in$ Taken

The number of constraints of this type depends on the structure of the Taken set. There are at most n constraints of this type.

Constraint B.3 (flow_external(1)) The constraint states that the sum of all flows ending in a node is equal to the sum of all external traffic leaving the node.

$$\forall j \in \text{Nodes}: \sum_{\substack{i \in Nodes \\ \overline{ij} \in Taken}} f_{ij} + rest_j^{in} = c_j^{out}$$

We have n constraints of this type.

Constraint B.4 The constraint states that the variable $rest_j^{in}$ of all non-taken flows ending in a node j is 0, if all flows ending in the node are in the Taken set.

$rest_j^{in} = 0$ if $\forall i \in$ Nodes: $\overline{ij} \in$ Taken

The number of constraints of this type depends on the structure of the Taken set. There are at most n constraints of this type.

Constraint B.5 (traffic_contribution_equal) The constraint states that the sum of all flows through a line can be used to approximate the traffic on the line.

$$\forall kl \in \text{Lines}: \sum_{\substack{\overline{ij} \in R_{kl} \\ \overline{ij} \in Taken}} r_{ij}^{kl} * f_{ij} + \sum_{\{i | \forall i, j \in Nodes: \overline{ij} \in Taken \vee \overline{ij} \in R_{kl}\}} rest_i^{out} \leq t_{kl}$$

$$\forall kl \in \text{Lines}: \sum_{\substack{\overline{ij} \in R_{kl} \\ \overline{ij} \in Taken}} r_{ij}^{kl} * f_{ij} + \sum_{\{j | \forall i, j \in Nodes: \overline{ij} \in Taken \vee \overline{ij} \in R_{kl}\}} rest_j^{in} \leq t_{kl}$$

$$\forall kl \in \text{Lines}: t_{kl} \leq \sum_{\substack{\overline{ij} \in R_{kl} \\ \overline{ij} \in Taken}} r_{ij}^{kl} * f_{ij} + \sum_{\{i | \exists \overline{ij} \in R_{kl} \text{ s.t. } \overline{ij} \notin Taken\}} rest_i^{out}$$

$$\forall kl \in \text{Lines}: t_{kl} \leq \sum_{\substack{\overline{ij} \in R_{kl} \\ \overline{ij} \in Taken}} r_{ij}^{kl} * f_{ij} + \sum_{\{j | \exists \overline{ij} \in R_{kl} \text{ s.t. } \overline{ij} \notin Taken\}} rest_j^{in}$$

We have m constraints of this type.

Constraint B.6 (solution_term(1)) The constraint states that the flow between two PoPs is related to the sum of all flows between nodes which belong to the first and second PoP.

We restrict ourselves to flows that are in the Find set of interesting flows.

$$\forall pq \in \text{Find:} \sum_{\substack{i \in p \\ j \in q \\ ij \in Taken}} f_{ij} \le s_{pq}$$

$$\forall pq \in \text{Find:} \quad s_{pq} \le \sum_{\substack{i \in p \\ j \in q \\ ij \in Taken}} f_{ij} + \sum_{\{i \mid \exists i \in p \text{ s.t. } ij \notin Taken\}} rest_i^{out}$$

We have |Find| constraints of this type.

B.4 Objective Functions

As result of the flow analysis we want to have lower and upper bounds for all solution variables. This implies the objective functions $$\min s_{pq}$$

and $$\max s_{pq}$$

which are run independently for all pairs of PoPs pq in Find. This means that we have to run 2*|Find| optimization queries. We can reduce this value by checking if a particular solution variable $s_{pq}$ has a value 0 in one of the other optimization runs. If that happens, we do not have to check it for minimum value.

B.5 Complexity

The model presented has |Taken|+2n+|Find| variables and at most 4n+4m+2*|Find| constraints. For a flow analysis we have to run at most 2*|Find| queries.

On the other hand note that we still need to know the $r_{ij}^{kl}$ values, and for this we need to calculate all node to node routes in the network.

B.6 Optimizer

In analogy to the constraints above we can relax the definitions and constraints regarding the optimizer model.

B.7 Choosing Taken and Find Sets

The above mode depends on a wise choice of the Taken and Find sets in order to reduce the loss of accuracy of the model. The a priori bounds for flows mentioned below help with this.

A Priori Flow Bounds

All flow variables have a lower bound of 0. An upper bound for each flow can be easily computed as $$\forall i,j \in \text{Nodes: } f_{ij} \le t_{kl} \text{ if } ij \in R_{kl}$$

A similar bound is found on the external traffic:

$$\forall i,j \in \text{Nodes: } f_{ij} \le c_i^{in}$$

$$\forall i,j \in \text{Nodes: } f_{ij} \le c_j^{out}$$

These bounds can be trivially extended to the solution variables. The resulting values may be very weak. Sometimes, a stronger bound is found by $$s_{pq} \le t_{kl} \text{ if } \forall i \in p, j \in q: r_{ij}^{kl}=1$$

All these bounds are expressed on the corrected traffic variables. Using the uncorrected values instead may lead to misleading results.

Handling Unknown Traffic Values

The error correction model assumes that for each line in the model we know the observed traffic volume. Unfortunately, this may not always be the case. A typical example are interfaces which are connected to backbone lines, but for which we can not collect any traffic data, due to problems of the data collector or of the network device. In the models described above, we allowed the observed traffic to be a variable of the model, which would be left uninstantiated in certain situations. These variables would be assigned a value in the error correction, choosing a number which would cause minimal error correction in other parts of the network.

Alternatively, set the traffic of such unobserved variables to 0 and to allow a free error correction on these interfaces. This will have the same overall effect on the model, but is simpler and leads to a more consistent view of the problem.

Whilst in the above described embodiments linear objective functions are described, it is appreciated that alternatively quadratic objective functions can be used.

Whilst in the above described embodiments, IP networks are described, it is appreciated that the invention may be implemented into other types of communication networks.

Whilst in the above described embodiments the use of flow rates are described, it is appreciated that alternatively the whole calculation could also be done directly in volume.

Whilst in the above described embodiments the traffic data measurements are obtained using the SNMP, it is appreciated that alternatively other methods can be used.

Whilst in the above described embodiments a specific set of traffic data measurements obtained from the router and router interfaces are described, it is appreciated that other measurements can be used instead or in addition to the measurements described.

It is to be understood that the embodiments described above are preferred embodiments only. Namely, various features may be omitted, modified or substituted by equivalents without department from the scope of the present invention, which is defined in the accompanying claims.

The invention claimed is:

1. A method of calculating traffic values in a communications network, the communications network comprising a plurality of nodes, the nodes being connected to one another by links, the method comprising: (a) obtaining at a management system, traffic data measurements through said nodes or links in an initial scenario as input data; (b) deriving at the management system, a traffic flow model for a modified scenario using a plurality of constraints describing the interdependency of said initial to said modified scenario and derived from the network topology and network behavior of the initial network; and (c) calculating at the management system, upper and lower bounds of traffic values for said modified scenario from said traffic flow model using said input data, wherein calculating comprises solving a linear programming problem by computing the upper and lower bounds of the traffic values; wherein said modified scenario comprises one or more of: a modified network topology, modified routing algorithm parameters, modified traffic engineering constraints, or modified traffic load compared to the initial scenario.

2. A method according to claim 1, wherein step (b) further comprises performing a routing procedure in said modified scenario.

3. A method according to claim 1, further comprising the step of verifying the consistency of the measured input data using information about the network topology or the network behaviour of the initial scenario.

4. A method according to claim 1, wherein said input data are corrected if inconsistencies are detected.

5. The method of claim 4, further comprising solving a linear programming problem with a linear objective function to minimize the data traffic reconciliation (error correction).

6. The method of claim 4, further comprising solving a linear programming problem with a non-linear objective function to minimize the data traffic reconciliation (error correction).

7. A method according to claim 1, wherein in step (b) the traffic values in the modified scenario are expressed as a linear function of node-to-node flows in the initial scenario.

8. A method according to claim 1, wherein traffic values which are not affected by the modifications from said initial to said modified scenario are equal to the corresponding input data or corrected input data of the initial scenario.

9. A method according to claim 1, wherein said traffic values comprise utilization, overload, or traffic volume values.

10. A method according to claim 1, wherein said constraints comprise linear constraints.

11. A method according to claim 1, wherein said constraints comprise non-linear constraints.

12. A method according to claim 11, wherein a linear approximation to a non-linear constraint is used.

13. A method according to claim 1, wherein solving a linear programming problem comprises: selecting a first and a second node; solving a first linear programming problem by computing the upper bound of traffic flow values from the first to the second node; and solving a second linear programming problem by computing the lower bound of traffic flow values from the first to the second set of nodes.

14. The method of claim 1, further comprising repeating step (a) at different times or at periodic intervals.

15. A method of calculating traffic values in a communications network, the communications networking comprising a plurality of nodes, the nodes being connected to one another by links, the method comprising: (a) obtaining at a management system, data traffic data measurements through said nodes or links in an initial scenario as input data; (b) considering a modified scenario; (c) defining one or more solution variables for said modified scenario; (d) determining at the management system, constraints between traffic flows through said links and nodes to describe the network topology and behavior of the network, said constraints derived from a network topology and network behavior based on the initial scenario; and (e) deriving at the management system, a traffic flow model using said input data and said relations for calculating said solution variables, wherein said solution variable is expressed as a linear function of one or more node-to-node flows of the network; wherein said modified scenario comprises one or more of: a modified network topology, modified routing algorithm parameters, modified traffic engineering constraints, or modified traffic load compared to the initial scenario.

16. A method according to claim 15, wherein step (b) further comprises performing a routing process for said modified scenario.

17. The method of claim 15, wherein said constraints in step (b) include relations among data traffic rates based on the definition of network protocol (such as IP, TCP, UDP) which defines the network behaviour.

18. A method according to claim 15, wherein said constraints comprising any of the following constraints:
routing-based constraints
link-based constraints
node-based constraints
error-based constraints.

19. The method of claim 15, wherein said constraints relate to any of the following:

the size of data packets used in the network;
relationship between the number of data packets and the data traffic volume;
constraints determined by the routing protocol used in the network;
the relationship between incoming and outgoing data traffic at said plurality of nodes;
the relationship between the data traffic at both ends of each link;
the relationship between the data traffic along said routes and the data traffic input into and output from the network.

20. A method according to claim 15, further comprising repeating stages (b), (c) and (d) for different modifications of said network.

21. A method according to claim 20, further comprising calculating a minimal and a maximal value for each solution variable taking into account one or more of said different modifications.

22. A method according to claim 20, further comprising calculating one consistent solution for all solution variables taking into account all said modifications.

23. An apparatus for calculating traffic values in a communications network, the communications network comprising a plurality of nodes, the nodes being connected to one another by links, the apparatus comprising: a processor for: (a) obtaining traffic data measurements through said nodes or links in an initial scenario as input data; (b) deriving a traffic flow model for a modified scenario using a plurality of constraints describing the interdependency of said initial to said modified scenario and derived from the network topology and network behavior of the initial network; and (c) calculating upper and lower bounds of traffic values for said modified scenario from said traffic flow model using said input data, wherein calculating comprises solving a linear programming problem by computing the upper and lower bounds of the traffic values; and memory for storing said traffic data measurements and said traffic flow model; wherein said modified scenario comprises one or more of: a modified network topology, modified routing algorithm parameters, modified traffic engineering constraints, or modified traffic load compared to the initial scenario.

24. A network management system for managing a network comprising a plurality of nodes, the nodes being interconnected by links, the network management system comprising: a processor for: (a) obtaining data traffic data measurements through said nodes or links in an initial scenario as input data; (b) considering a modified scenario; (c) defining one or more solution variables for said modified scenario; (d) determining constraints between traffic flows through said links and nodes to describe the network topology and behavior of the network, said constraints derived from a network topology and network behavior based on the initial scenario; (e) deriving a traffic flow model using said input data and said relations for calculating said solution variables, wherein said solution variable is expressed as a linear function of one or more node-to-node flows of the network; and memory for storing said data traffic measurements and said traffic flow model; wherein said modified scenario comprises one or more of: a modified network topology, modified routing algorithm parameters, modified traffic engineering constraints, or modified traffic load compared to the initial scenario.

25. A non-transitory computer readable medium encoded with a computer program for calculating traffic values in a communication network, the communication network comprising a plurality of nodes connected to one another by links, the computer program comprising: code for obtaining traffic data measurements through said nodes or links in an initial scenario as input data; code for deriving a traffic flow model for a modified scenario using a plurality of constraints describing the interdependency of said initial to said modified scenario and derived from the network topology and network behavior of the initial network; and code for calculating values or upper and lower bounds of traffic values for said modified scenario from said traffic flow model using said input data, wherein code for calculating comprises code for solving a linear programming problem by computing the upper and lower bounds of the traffic values; wherein said modified scenario comprises one or more of: a modified network topology, modified routing algorithm parameters, modified traffic engineering constraints, or modified traffic load compared to the initial scenario.

* * * * *